(12) United States Patent
Ishida

(10) Patent No.: US 9,771,056 B2
(45) Date of Patent: Sep. 26, 2017

(54) VEHICLE CONTROL DEVICE

(71) Applicant: ADVICS CO., LTD., Kariya-shi, Aichi-ken (JP)

(72) Inventor: Yasuhito Ishida, Toyokawa (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/909,417

(22) PCT Filed: Jul. 31, 2014

(86) PCT No.: PCT/JP2014/070262
§ 371 (c)(1),
(2) Date: Feb. 1, 2016

(87) PCT Pub. No.: WO2015/016325
PCT Pub. Date: Feb. 5, 2015

(65) Prior Publication Data
US 2016/0200300 A1 Jul. 14, 2016

(30) Foreign Application Priority Data
Jul. 31, 2013 (JP) ................. 2013-159458

(51) Int. Cl.
*B60T 8/175* (2006.01)
(52) U.S. Cl.
CPC .................... *B60T 8/175* (2013.01)
(58) Field of Classification Search
CPC ..................................................... B60T 8/175
(Continued)

(56) References Cited

U.S. PATENT DOCUMENTS 5,000,281 A 3/1991 Nobumoto et al.
6,269,297 B1 * 7/2001 Hosomi ................. B60K 28/16
180/197

(Continued)

FOREIGN PATENT DOCUMENTS

EP 0449118 A2 10/1991
JP 02-262455 A 10/1990
(Continued)

OTHER PUBLICATIONS

International Search Report (PCT/ISA/210) issued on Nov. 4, 2014, by the Japanese Patent Office as the International Searching Authority for International Application No. PCT/JP2014/070262.
(Continued)

*Primary Examiner* — Brian P Sweeney
(74) *Attorney, Agent, or Firm* — Buchanan Ingersoll & Rooney PC

(57) ABSTRACT

A vehicle control device corrects the amount of brake control according to the degree of stall prevention requests such that the brake control amount is matched to a travel state. For example, when the vehicle body speed is low, the vehicle body is often traveling a road surface that is difficult to travel, and the degree of stall prevention requests is small. In such cases, the vehicle control device exhibits LSD effects and increases ground-covering properties by executing vehicle wheel slip control based on stronger brake control, while increasing safety properties by better enabling generation of deceleration. Then, as the vehicle body speed increases, because it is conceivable that the vehicle body is leaving a place that is difficult to travel and the degree of stall prevention requests is high, the vehicle control device executes switching such that brake control is lowered.

4 Claims, 14 Drawing Sheets

1 ENGINE
2b AUXILIARY TRANSMISSION
8 REAR DIFFERENTIAL
15 BRAKE ACTUATOR
2a TRANSMISSION
6 FRONT DIFFERENTIAL
10 ENGINE ECU
19 BRAKE ECU

(58) Field of Classification Search
USPC .......................................................... 701/83
See application file for complete search history.

(56) References Cited

U.S. PATENT DOCUMENTS

2002/0195873 A1* 12/2002 Fawkes .................. B60K 28/16
                                                                303/139
2009/0076699 A1    3/2009  Osaki et al.

FOREIGN PATENT DOCUMENTS

| JP | 03-281469 A   | 12/1991 |
| JP | 2000-344083 A | 12/2000 |
| JP | 2001-328516 A | 11/2001 |
| JP | 2006-240386 A |  9/2006 |
| JP | 2009-067358 A |  4/2009 |

OTHER PUBLICATIONS

Written Opinion (PCT/ISA/237) issued on Nov. 4, 2014, by the Japanese Patent Office as the International Searching Authority for International Application No. PCT/JP2014/070262.

* cited by examiner

[Fig. 1]
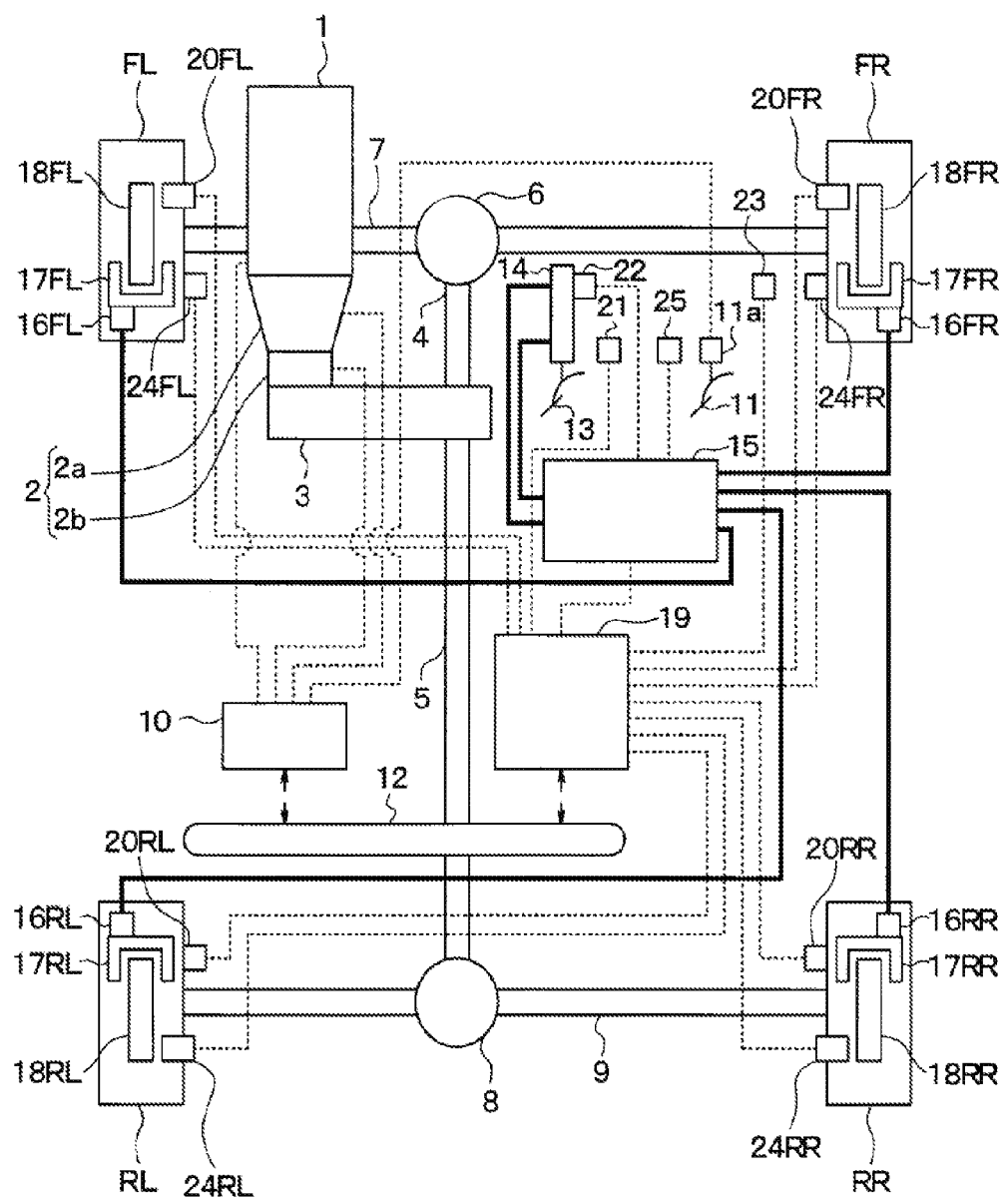
1 ENGINE
2b AUXILIARY TRANSMISSION
8 REAR DIFFERENTIAL
15 BRAKE ACTUATOR
2a TRANSMISSION
6 FRONT DIFFERENTIAL
10 ENGINE ECU
19 BRAKE ECU

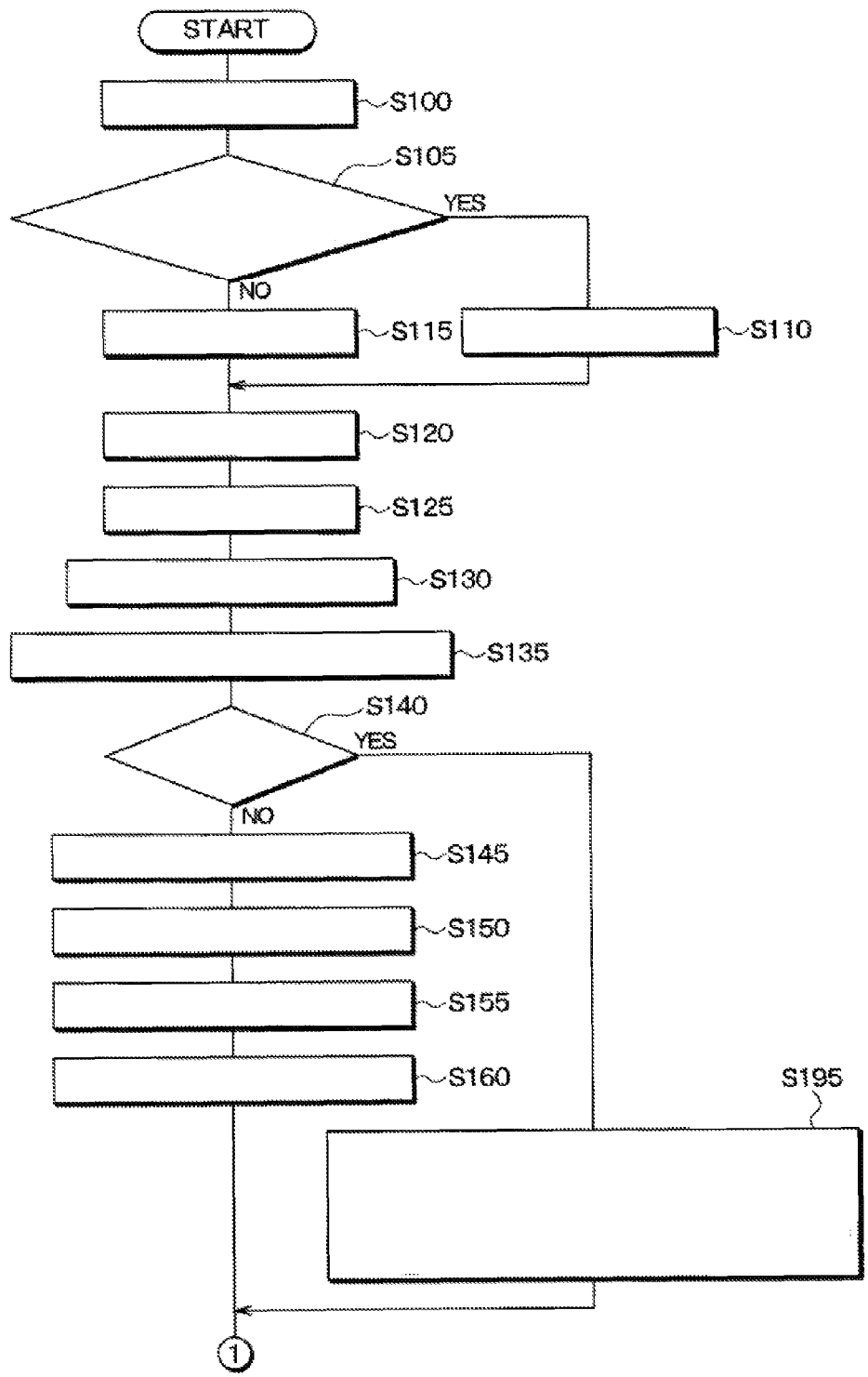
[Fig. 2A]

[Fig. 2C]

S100 INPUT PROCESSING
S105 AUXILIARY TRANSMISSION GEAR POSITION = L4 & OSC SWITCH = ON?
S110 OSC CONTROL PERMITTED
S115 OSC CONTROL PROHIBITED
S120 CALCULATE VEHICLE BODY SPEED V0
S125 CALCULATE VEHICLE BODY ACCELERATION V0'
S130 CALCULATE SLOPING ROAD GRADE DRIVING FORCE SLOP
S135 CALCULATE BRAKE CORRESPONDING DRIVING FORCE FOOTBRAKE
S140 OSC CONTROL PROHIBITED?
S145 CALCULATE ENGINE TARGET THRESHOLD SPEED
S150 ACCELERATOR OPERATION AMOUNT REQUESTED DRIVING FORCE
S155 CALCULATE OSC BRAKE TARGET THRESHOLD SPEED
S160 CALCULATE TRC BRAKE TARGET THRESHOLD SPEED
S195 CALCULATE REGULAR TRC BRAKE TARGET THRESHOLD SPEED TRCbrake
CORRECTION COEFFICIENT (TB) = 1.0
THRESHOLD (TV) = REGULAR TRC BRAKE TARGET THRESHOLD SPEED
 WHEEL OSC FINAL TARGET OIL PRESSURE (TOP2) = 0 Mpa
ENG_REQ = −1000N

[Fig. 2B]

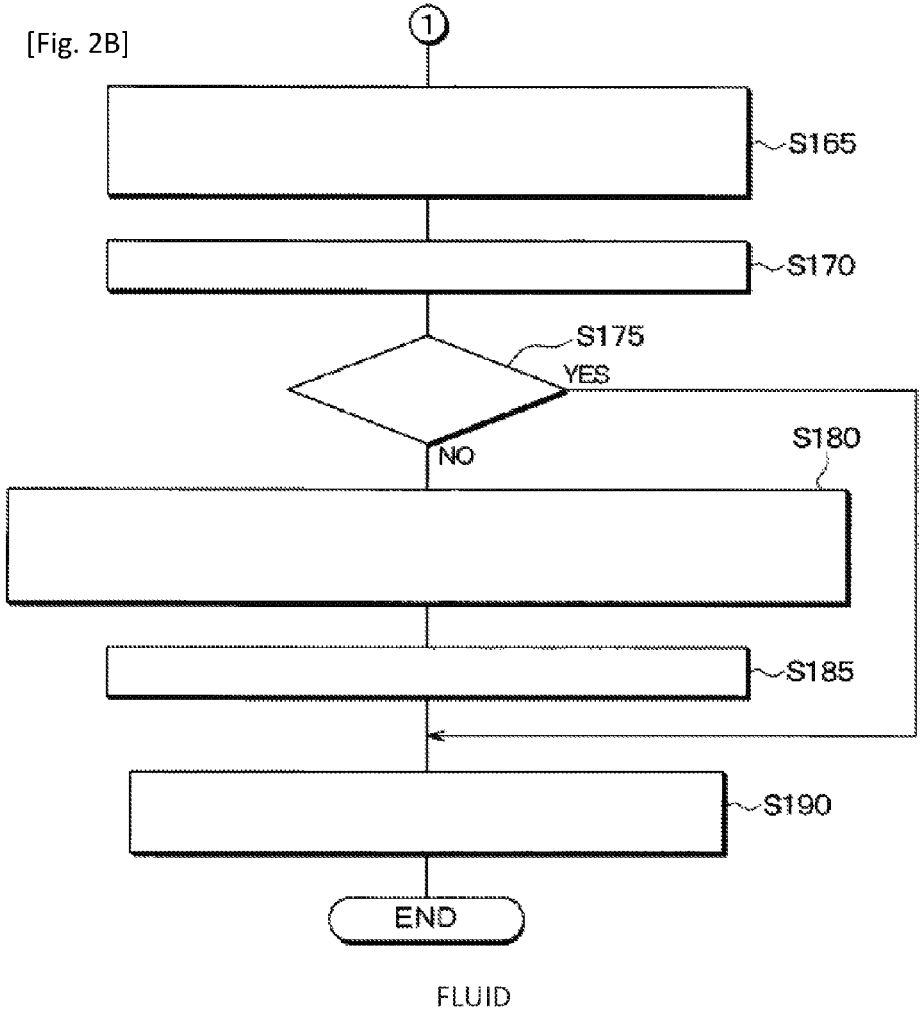

FLUID

S165 CALCULATION OF TRC BRAKE CONTROL AMOUNT **WHEEL TRC TARGET
FLUID PRESSURE (TTP1) = (VW − (V0 + TV)) × GAIN FEEDBACK
CALCULATION
S170 WHEEL TRC FINAL TARGET OIL PRESSURE (TTP2) = TTP1** × TB
S175 OSC CONTROL PROHIBITED ?
S180 CALCULATION OF OSC BRAKE CONTROL AMOUNT
OSC TARGET CONTROL AMOUNT (TOB) = (V0 − TVB) × GAIN
FEEDBACK CALCULATION
WHEEL OSC TARGET FLUID PRESSURE (TOP1) = TOB × BRAKE
FLUID PRESSURE CONVERSION
S185 WHEEL OSC FINAL TARGET FLUID PRESSURE (TOP2) = TOP1**
× CB
S190 BARKE CONTROL AMOUNT CALCULATION (OUTPUT VALUE)
WHEEL TARGET FLUID PRESSURE (TP) = TTP2 + TOP2

[Fig. 3]
| PRIORITY LEVEL | CONDITION | TVE |
|---|---|---|
| 1 | BRAKING STATE | 0 |
| 2 | TVEtmp1 > TVE | TVE + 0.03G |
| 3 | OTHER THAN THE ABOVE | TVEtmp1 |
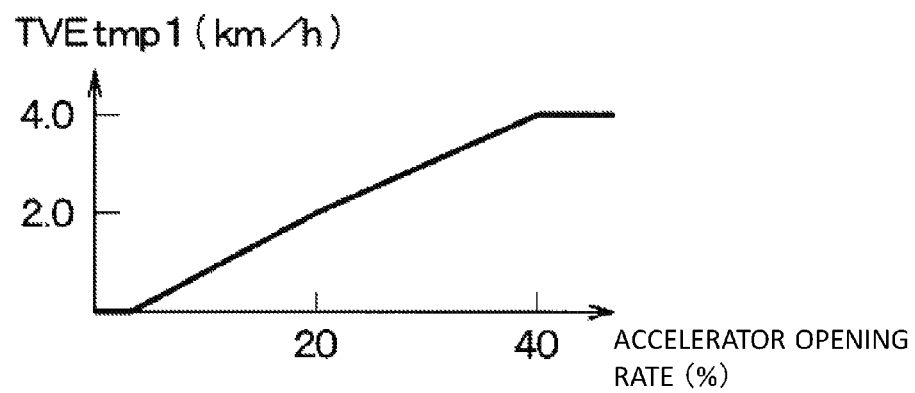
[Fig. 4]

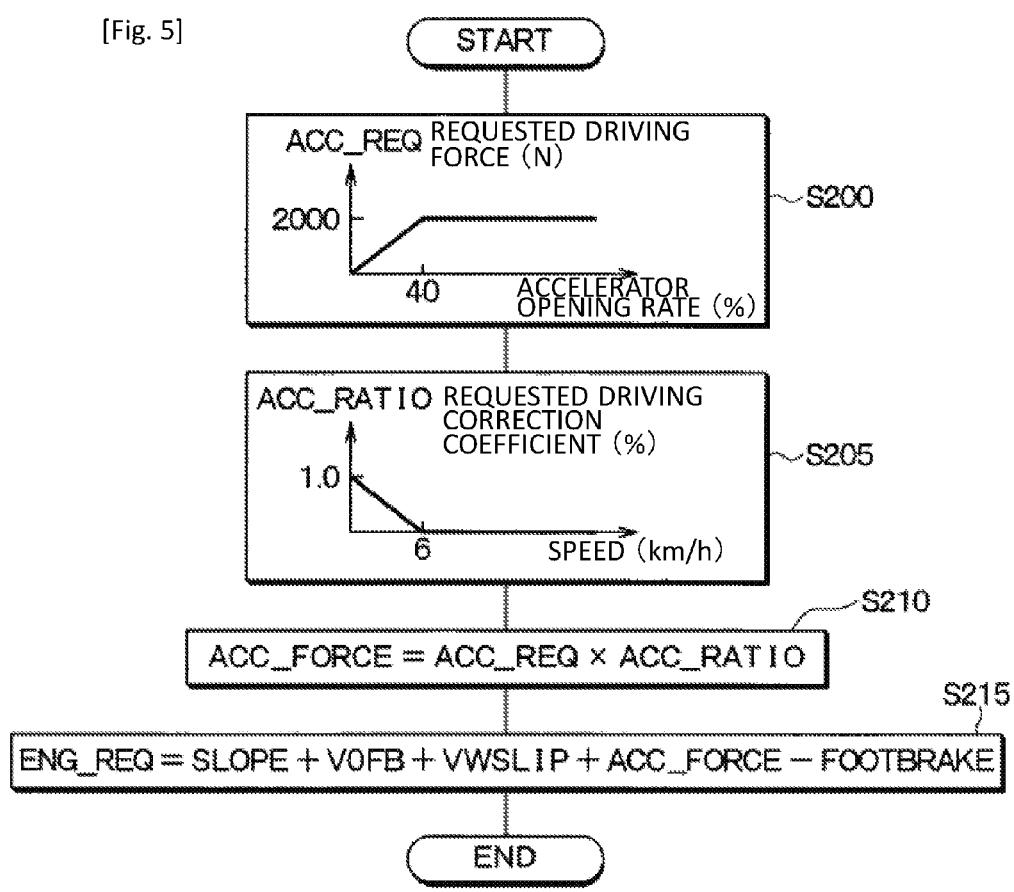

[Fig. 6]
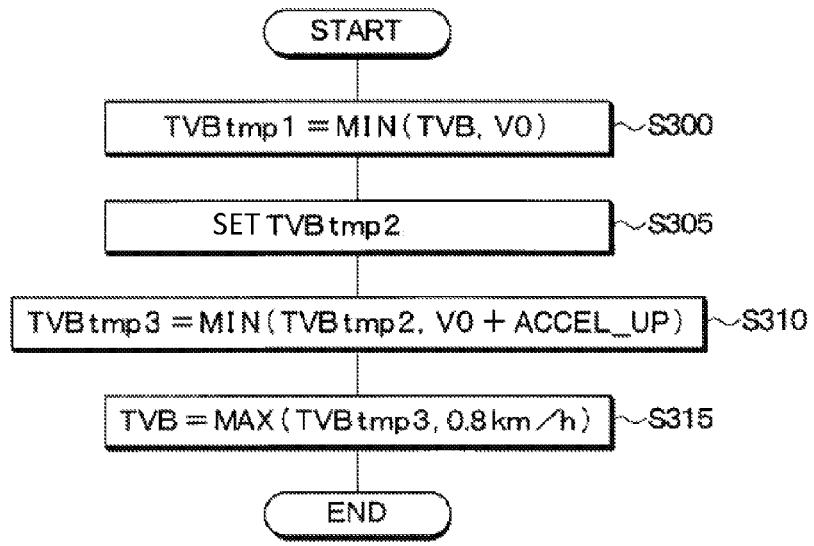
[Fig. 7]
| PRIORITY LEVEL | CONDITION | TVBtmp2 |
|---|---|---|
| 1 | BACKUP CONTROL & AT MOST 10 km/h | TVB + 0.025G |
| 2 | BACKUP CONTROL & AT LEAST 10 km/h | TVB + 0.05G |
| 3 | ACCELERATOR ON | TVB + ACCEL_G |
| 4 | DURING BRAKING | TVBtmp1 − 0.1G |
| 5 | ACCELERATOR OFF TIME PERIOD < T SECONDS | TVBtmp1 − 0.1G |
| 6 | OTHER THAN THE ABOVE | TVBtmp1 − 0.025G |

[Fig. 8]
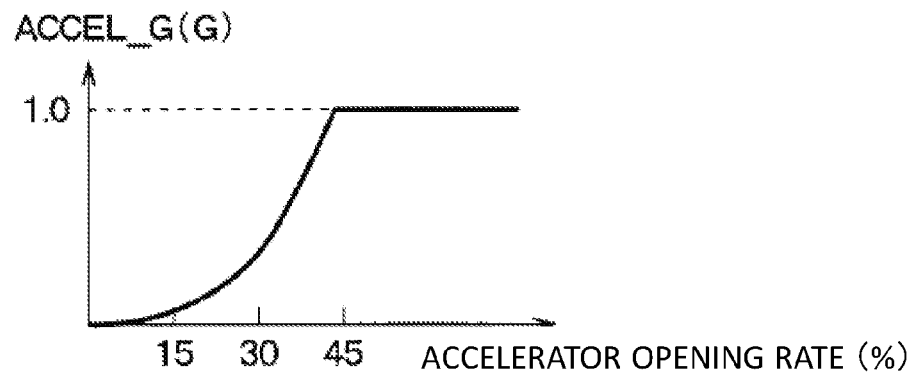
[Fig. 9]
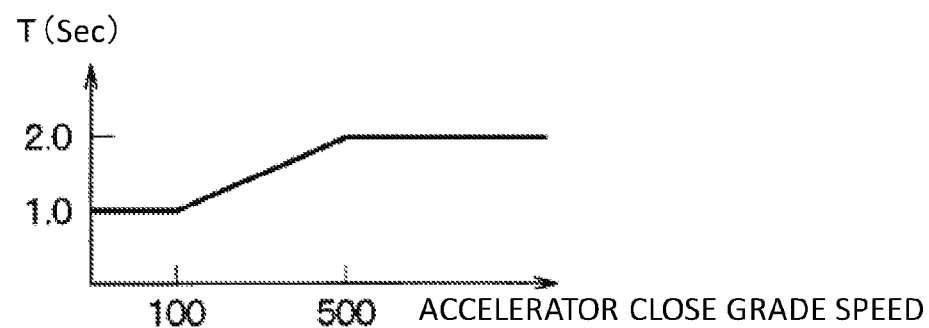
[Fig. 10]
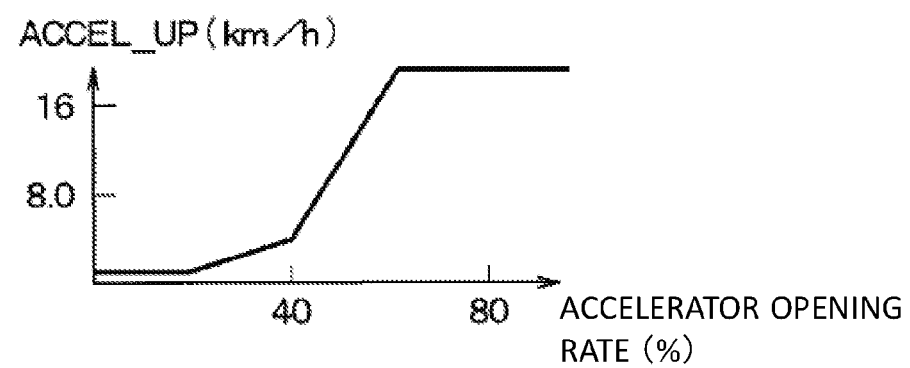

[Fig. 11]

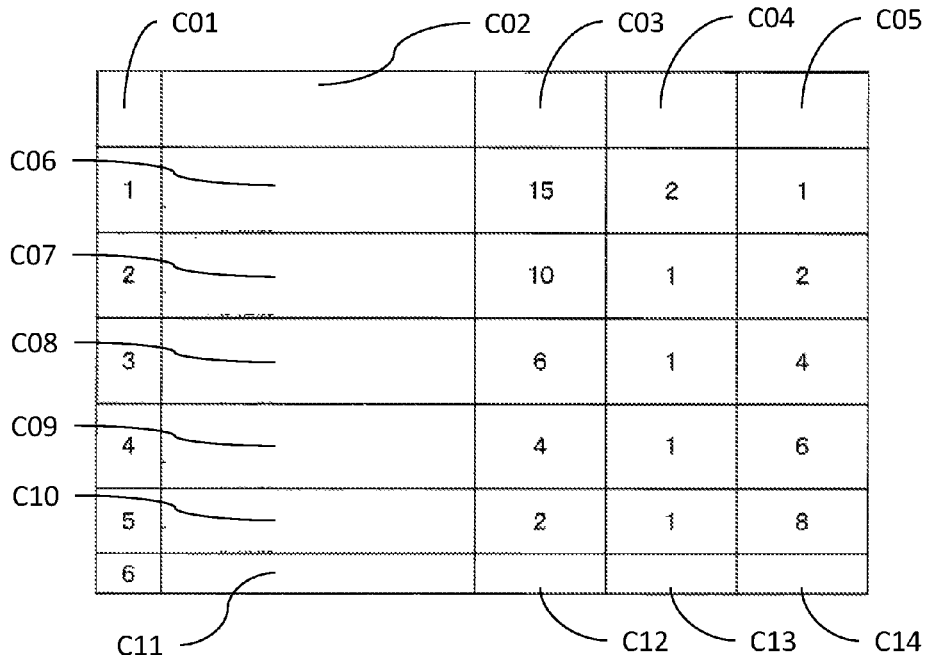

C01 PRIORITY LEVEL
C02 CONDITION
C03 FIRST BRAKE COEFFICIENT (TB1)
C04 OSCBRAKE CORRECTION COEFFICIENT (CB)
C05 FIRST THRESHOLD (TV1)
C06 V0 = 0 Km/h & NOT IN BRAKING STATE
    LAST FOR 1 SECOND
C07 PRIORITY LEVEL 1 NOT ESTABLISHED & V0 < 3 km/h
    LAST FOR 1 SECOND
C08 PRIORITY LEVELS 1 AND 2 NOT ESTABLISHED & 3 km/h ≦ V0 < 6 km/h
    LAST FOR 1 SECOND
C09 PRIORITY LEVELS 1 TO 3 NOT ESTABLISHED & 6 km/h ≦ V0 < 10 km/h
    LAST FOR 1 SECOND
C10 10 km/h ≦ V0
    LAST FOR 1 SECOND
C11 OTHER THAN THE ABOVE
C12 PREVIOUS VALUE
C13 PREVIOUS VALUE
C14 PREVIOUS VALUE

[Fig. 12]
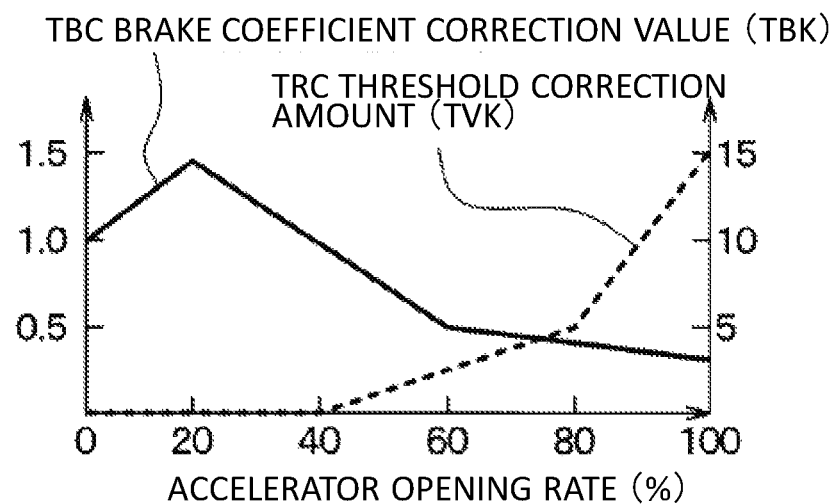
[Fig. 13]
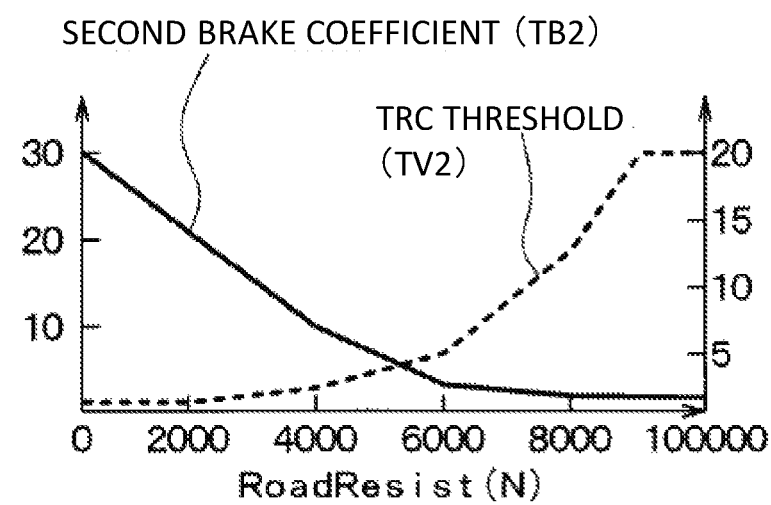

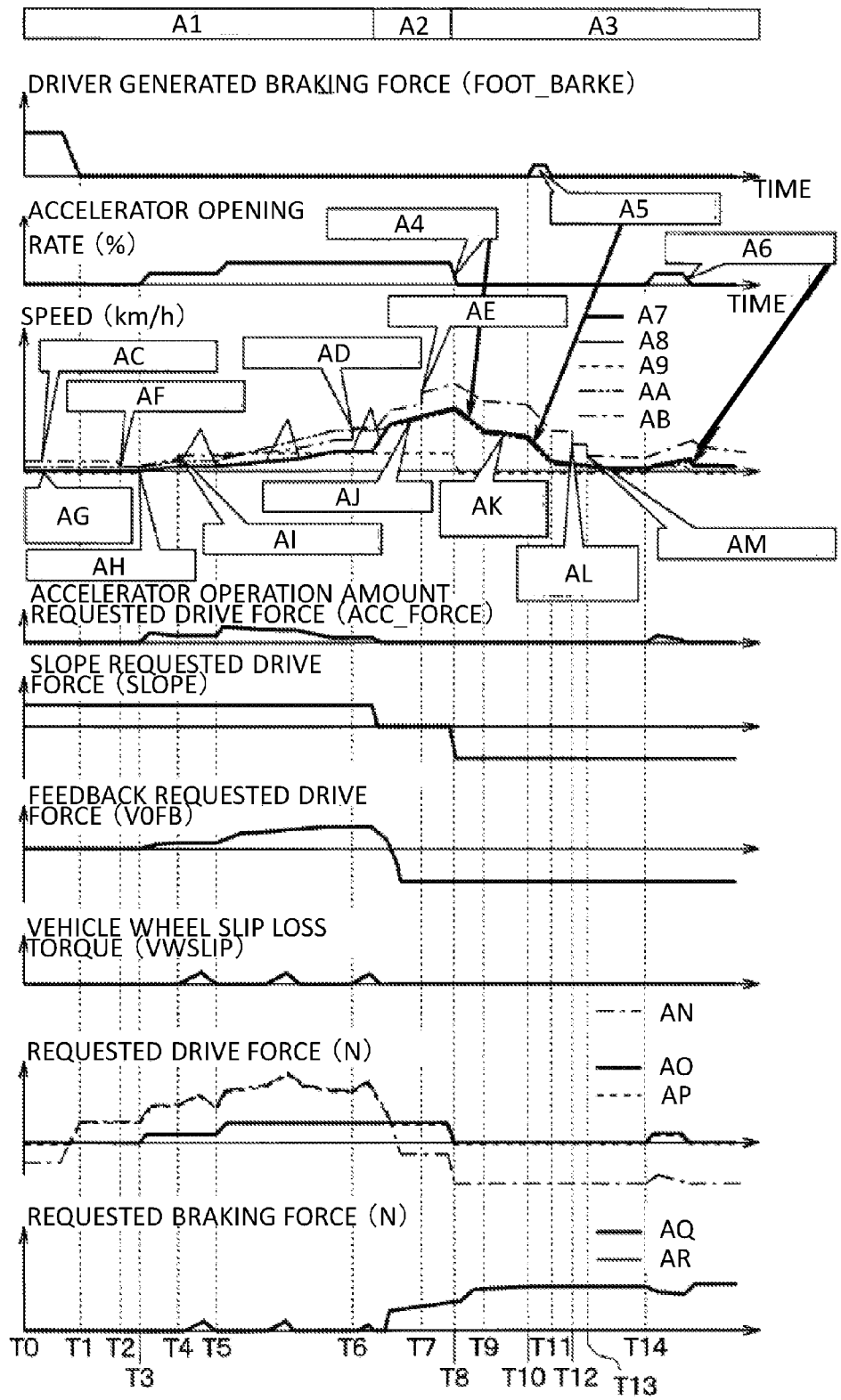
[Fig. 14A]

[Fig. 14B]

A1 CLIMBING
A2 LEVEL
A3 DESCENDING
A4 FIGURE 7, SELECTION OF PRIORITY 5
A5 FIGURE 7, SELECTION OF PRIORITY 4
A6 FIGURE 7, SELECTION OF PRIORITY 5
A7 VEHICLE BODY SPEED (V0)
A8 VEHICLE WHEEL SPEED (SLIP WHEEL)
A9 OSC ENGINE TARGET THRESHOLD SPEED
AA OSC BRAKE TARGET THRESHOLD SPEED
AB TRC BRAKE TARGET THRESHOLD SPEED
AC FIGURE 11, SELECTION OF PRIORITY 2
AD FIGURE 11, SELECTION OF PRIORITY 3
AE FIGURE 11, SELECTION OF PRIORITY 4
AF FIGURE 11, SELECTION OF PRIORITY 1
AG FIGURE 7, SELECTION OF PRIORITY 1
AH FIGURE 7, SELECTION OF PRIORITY 3
AI FIGURE 11, SELECTION OF PRIORITY 2
AJ FIGURE 7, SELECTION OF PRIORITY 3
AK FIGURE 7, SELECTION OF PRIORITY 6
AL FIGURE 11, SELECTION OF PRIORITY 3
AM FIGURE 11, SELECTION OF PRIORITY 2
AN OSC REQUESTED DRIVE FORCE (ENG_REQ)
AO DRIVER REQUESTED DRIVE FORCE
AP FINAL REQUESTED DRIVE FORCE
AQ REQUESTED BRAKING FORCE FOR EACH WHEEL (N)
AR SLIP WHEEL REQUESTED BRAKEING FORCE (N)

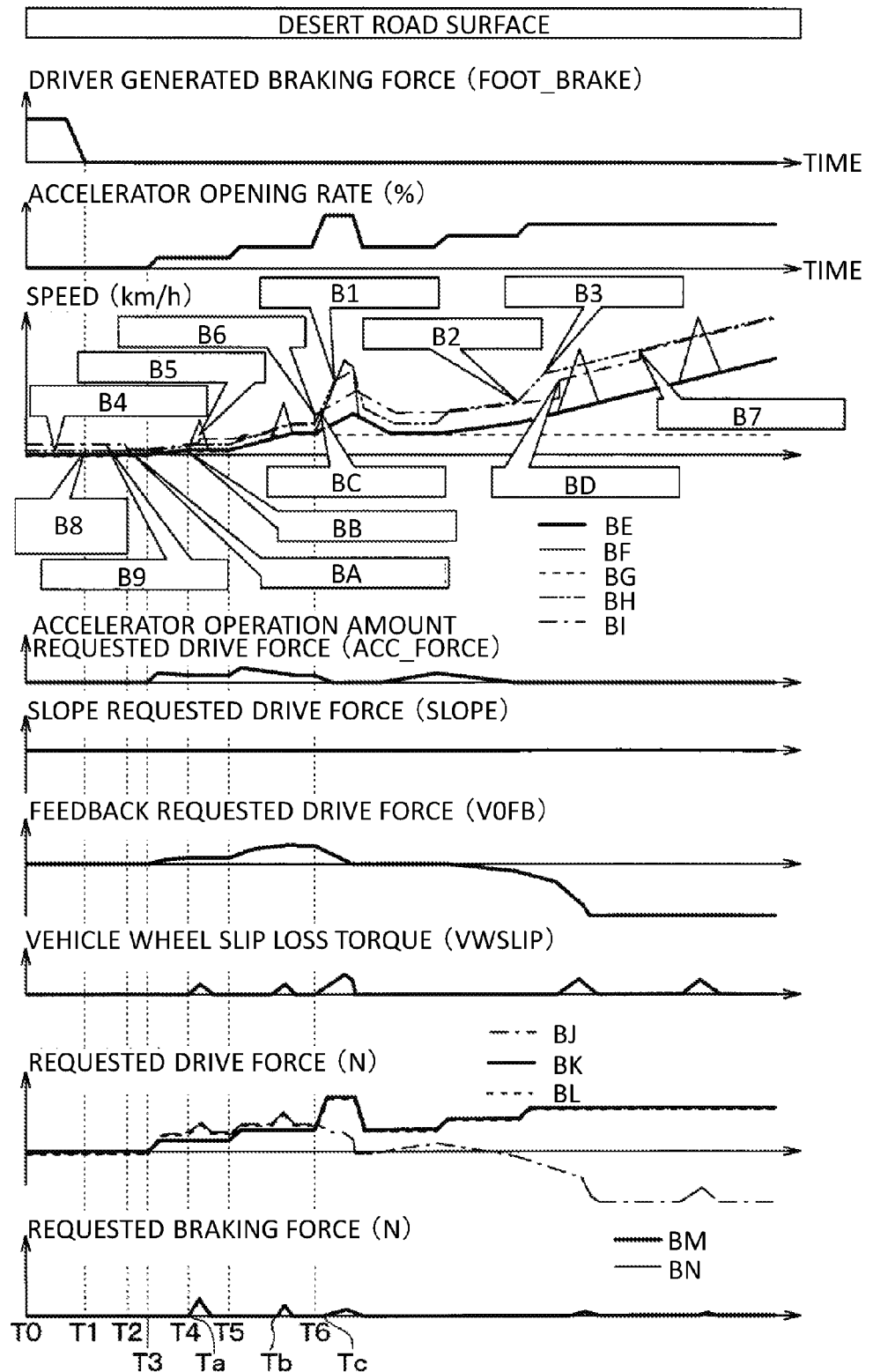
[Fig. 15A]

[Fig. 15B]

B1 FIGURE 7, SELECTION OF PRIORITY 3
B2 FIGURE 7, SELECTION OF PRIORITY 3
B3 FIGURE 7, SELECTION OF PRIORITY 3
B4 FIGURE 7, SELECTION OF PRIORITY 1
B5 FIGURE 11, SELECTION OF PRIORITY 2
B6 FIGURE 11, SELECTION OF PRIORITY 3
B7 FIGURE 11, SELECTION OF PRIORITY 5
B8 FIGURE 7, SELECTION OF PRIORITY 2
B9 FIGURE 11, SELECTION OF PRIORITY 2
BA FIGURE 11, SELECTION OF PRIORITY 1
BB FIGURE 7, SELECTION OF PRIORITY 3
BC FIGURE 7, SELECTION OF PRIORITY 3
BD FIGURE 11, SELECTION OF PRIORITY 4
BE VEHICLE BODY SPEED (V0)
BF VEHICLE WHEEL SPEED (SLIP WHEEL)
BG OSC ENGINE TARGET THRESHOLD SPEED
BH OSC BRAKE TARGET THRESHOLD SPEED
BI TRC BRAKE TARGET THRESHOLD SPEED
BJ OSC REQUESTED DRIVE FORCE (ENG_REQ)
BK DRIVER REQUESTED DRIVE FORCE
BL FINAL REQUESTED DRIVE FORCE
BM REQUESTED BRAKING FORCE FOR EACH WHEEL (N)
BN SLIP WHEEL REQUESTED BRAKEING FORCE (N)

VEHICLE CONTROL DEVICE

TECHNICAL FIELD

The present invention relates to a vehicle control device configured to achieve smooth vehicle travel, and is preferably applied to travel on a surface of a road such as an off road or a sloping road, which possibly generates vehicle travel resistance.

BACKGROUND ART

There has been conventionally disclosed in Patent Literature 1 a vehicle traction control device configured to reduce a tolerable slip (target slip) of a driving wheel in a case where an auxiliary transmission included in a four-wheel drive vehicle is in low gear in order to improve ground-covering properties on an off road. This device is configured to reduce the tolerable slip of the driving wheel and execute idling inhibitory control so as to achieve traction control (hereinafter, referred to as TRC (registered trademark)) in accordance with a driver's intention of emphasizing the ground-covering properties.

CITATION LIST

Patent Literature

Patent Literature 1: JP 2000-344083 A

SUMMARY OF INVENTION

Technical Problems

However, even if a tolerable slip is reduced and idling inhibitory control is executed, a vehicle cannot smoothly travel on an off road or a sloping road unless an accelerator pedal is pressed so as to overcome a surface gradient and road-surface resistance of a stepped road or the like. Specifically, a vehicle travel state changes constantly and a vehicle body is shaken largely on an off road such as a rocky road or on a steeply sloping road, so that a driver cannot perform appropriate accelerator operation. Particularly a driver not used to traveling on an off road tends to perform rough accelerator operation and excessively press the accelerator pedal. When the accelerator pedal is pressed excessively, an acceleration slip is generated at a wheel and TRC is executed to generate large braking force for acceleration slip inhibitory control and stall the vehicle. The vehicle accordingly behaves against a driver's intention with a vehicle stall despite the fact that the driver is pressing the accelerator pedal.

Off road travel causes a travel state in which the ground-covering properties are improved by applying braking force to transmit driving force from a slipping wheel to a different wheel and a travel state in which braking force is excessively applied when a slip stops to stall a vehicle and deteriorate the ground-covering properties.

Conventionally, a tolerable slip is reduced and larger braking force is applied to improve the ground-covering properties when an auxiliary transmission is in low gear. TRC not matched to an actual travel state may be executed to rather deteriorate the ground-covering properties of a vehicle.

In view of the above, it is an object of the present invention to provide a vehicle control device configured to execute TRC better matched to a vehicle travel state to improve ground-covering properties of the vehicle.

Solutions to Problems

In order to achieve the object mentioned above, according to claim 1 of the present invention, a vehicle control device includes: a target speed setting means for setting traction brake target threshold speed as target speed of wheel speed of the vehicle; and a TRC means for generating braking force with the service brake when the wheel speed exceeds the target speed and an acceleration slip is generated, to execute TRC of causing the wheel speed to approach the traction brake target threshold speed; wherein the vehicle control device further includes a brake control amount correction means for determining a degree of a stall prevention request of the vehicle, and reducing a brake control amount for generation of braking force by the TRC in a case where the degree of the stall prevention request is high in comparison to a case where the degree is low.

A driver tends to excessively press an accelerator during off road travel or the like, a slip may be generated at a wheel, and TRC may be executed. In this case, there are a travel state in which the ground-covering properties are improved by transmitting driving force from a slipping wheel to a different wheel and a travel state in which the slip stops and braking force is excessively applied to decrease vehicle body speed V0 and deteriorate the ground-covering properties. The former is regarded as a travel state with a lower degree of the stall prevention request and the latter is regarded as a travel state with a higher degree of the stall prevention request. Accordingly, the brake control amount is corrected in accordance with the degree of the stall prevention request so as to be matched to a travel state. TRC better matched to the vehicle travel state is thus executed to improve the ground-covering properties of the vehicle.

According to claim 2 of the present invention, the brake control amount correction means determines that the degree of the stall prevention request is higher as vehicle body speed of the vehicle is higher, and reduces the brake control amount for generation of braking force by the TRC in a case where the vehicle body speed is high in comparison to a case where the vehicle body speed is low.

The degree of the stall prevention request can be determined in accordance with the vehicle body speed in this manner. A vehicle travelling at low vehicle body speed often travels on a road surface of high travel difficulty with a small degree of the stall prevention request. In this case, stronger wheel slip inhibitory control by brake control is thus executed to exert a limited-slip differential (LSD (differential gear unit)) effect, improve the ground-covering properties, and generate more deceleration, so that safety can be enhanced. If the vehicle body speed increases, it is considered that the vehicle has left a place of high travel difficulty and the degree of the stall prevention request is high. Switching is thus performed to reduce the brake control amount, so as to prevent failing to reach speed requested by a driver due to generation of large braking force under a condition where the driver intends to drive faster.

According to claim 3 of the present invention, the brake control amount correction means detects road-surface resistance of a road surface travelled by the vehicle, determines that the degree of the stall prevention request is higher as the road-surface resistance is higher, and reduces the brake control amount for generation of braking force by the TRC in a case where the road-surface resistance is high in comparison to a case where the road-surface resistance is small.

The degree of the stall prevention request can be determined in accordance with the road-surface resistance in this manner. With high road-surface resistance, the vehicle tends to stall when braking force is generated by brake control. The brake control amount is thus made smaller than that for a road surface with small road-surface resistance. Control can thus be executed in accordance with the road-surface resistance of the travel surface. Examples of the road-surface resistance include resistance due to a condition of a surface of a desert road, a muddy road, or the like, and gravity applied in the vehicle longitudinal direction due to inclination of a road surface.

According to claim 4 of the present invention, the brake control amount correction means determines, in accordance with an accelerator opening rate, that the degree of the stall prevention request is higher as the accelerator opening rate is larger, and reduces the brake control amount for generation of braking force by the TRC in a case where the accelerator opening rate is large in comparison to a case where the accelerator opening rate is small.

The degree of the stall prevention request can be determined in accordance with the accelerator opening rate in this manner. The brake control amount is increased because driving force is large at the beginning of accelerator operation. With continuous accelerator operation, a slip amount due to acceleration increases and braking force increases excessively. The brake control amount is thus made smaller than that at the beginning of the pressing operation. Control can thus be executed in accordance with the accelerator opening rate.

BRIEF DESCRIPTION OF DRAWINGS

FIG. 1 is a diagram depicting system configurations of braking and driving systems of a vehicle equipped with a vehicle control device according to a first embodiment of the present invention.

FIG. 2A is a flowchart of entire OSC.

FIG. 2C is a caption of FIG. 2A.

FIG. 2B is a flowchart of entire OSC subsequent to FIG. 2A.

FIG. 3 is a chart illustrating a method of setting engine target threshold speed.

FIG. 4 is a map of the relation between an accelerator opening rate and temporary engine target threshold speed TVEtmp1.

FIG. 5 is a flowchart of detailed processing of calculating accelerator operation amount requested driving force.

FIG. 6 is a flowchart of processing of calculating OSC brake target threshold speed.

FIG. 7 is a chart illustrating a method of setting second brake target threshold speed TVBtmp2.

FIG. 8 is a map of the relation between the accelerator opening rate (%) and accelerator acceleration ACCEL_G.

FIG. 9 is a map of the relation between accelerator close grade speed and a large deceleration period T.

FIG. 10 is a map of the relation between the accelerator opening rate (%) and a speed upper limit value ACCEL_UP.

FIG. 11 is a chart of the relation among vehicle body speed V0 along with various conditions, a first brake coefficient TB1, a first threshold TV1, and an OSCbrake correction coefficient CB.

FIG. 12 is a map of the relation of a TRC brake coefficient correction value TBK and a TRC threshold correction value TVK to the accelerator opening rate (%).

FIG. 13 is a map of the relation of a second brake coefficient TB2 and a TRC threshold TV2 to road-surface resistance.

FIG. 14A is a timing chart of a case where a travel surface is a mogul road surface (an uneven surface with projections and recesses).

FIG. 14B is a caption of FIG. 14A.

FIG. 15A is a timing chart of a case where the travel surface is a desert road surface.

FIG. 15B is a caption of FIG. 15A.

DESCRIPTION OF EMBODIMENTS

The embodiments of the present invention will now be described below with reference to the drawings. It is noted that same or equivalent portions are to be denoted by same reference signs and described in the following embodiments.

First Embodiment

FIG. 1 is a diagram depicting system configurations of braking and driving systems of a vehicle equipped with a vehicle control device according to the first embodiment of the present invention. Described below is application of a vehicle posture control device according to an embodiment of the present invention to a four-wheel drive vehicle having a front drive base in a driving form provided with front wheels serving as main driving wheels and rear wheels serving as sub driving wheels. The vehicle posture control device is also applicable to a four-wheel drive vehicle having a rear drive base in a driving form provided with rear wheels serving as main driving wheels and front wheels serving as sub driving wheels.

As depicted in FIG. 1, the driving system of the four-wheel drive vehicle includes an engine 1, a transmission device 2, a driving force distribution control actuator 3, a front propeller shaft 4, a rear propeller shaft 5, a front differential 6, a front drive shaft 7, a rear differential 8, and a rear drive shaft 9. The driving system is controlled by an engine ECU 10 serving as an engine control means, or the like.

Specifically, when the engine ECU 10 receives an operation amount of an accelerator pedal 11, the engine ECU 10 controls the engine so as to generate engine output (engine torque) required for generation of driving force according to the accelerator operation amount. This engine output is transmitted to the transmission device 2 and is converted at a gear ratio according to a gear position set by the transmission device 2. The engine output thus converted is then transmitted to the driving force distribution control actuator 3 serving as a driving force distribution control means. The transmission device 2 includes a transmission 2a and an auxiliary transmission 2b. Output according to a gear position set by the transmission 2a is transmitted to the driving force distribution control actuator 3 during regular travel. In contrast, when the auxiliary transmission 2b is actuated during travel on an off road, a sloping road, or the like, output according to a gear position set by the auxiliary transmission 2b is transmitted to the driving force distribution control actuator 3. The driving force is then transmitted to the front propeller shaft 4 and the rear propeller shaft 5 in accordance with driving force distribution determined by the driving force distribution control actuator 3.

Driving force according to driving force distribution for front wheels is applied to front wheels FR and FL through the front drive shaft 7 that is connected to the front propeller shaft 4 by way of the front differential 6. Driving force according to driving force distribution for rear wheels is applied to rear wheels RR and RL through the rear drive shaft 9 that is connected to the rear propeller shaft 5 by way of the rear differential 8.

The engine ECU 10 is configured by a known microcomputer including a CPU, a ROM, a RAM, an I/O, and the like. The engine ECU 10 executes various calculation and processing according to programs stored in the ROM and the like to control engine output (engine torque) and control driving force generated at the respective wheels FL to RR. For example, the engine ECU 10 receives an accelerator open degree in accordance with a known technique and calculates engine output from the accelerator open degree and various engine controls. The engine ECU 10 transmits a control signal to the engine 1 for regulation of a fuel injection amount and the like and control of the engine output. The engine ECU 10 can determine that the accelerator pedal 11 is ON if the accelerator open degree exceeds an accelerator ON threshold. There is provided in the present embodiment an accelerator switch 11*a* configured to indicate whether or not the accelerator pedal 11 is operated. The engine ECU 10 detects that the accelerator pedal 11 is ON when receiving a detection signal from the accelerator switch 11*a*. The engine ECU 10 also executes TRC. For example, the engine ECU 10 acquires information on wheel speed and vehicle body speed (estimated vehicle body speed) from a brake ECU 19 to be described later. The engine ECU 10 outputs a control signal to the brake ECU 19 so as to inhibit an acceleration slip indicated by a deviation therebetween so as to apply braking force to a control target wheel and decrease driving force. The acceleration slip is thus inhibited so as to accelerate the vehicle efficiently.

Although not depicted herein, the transmission device 2 is controlled by a transmission ECU and driving force distribution is controlled by a driving force distribution ECU or the like. These ECUs and the engine ECU 10 mutually exchange information through an onboard LAN 12. According to FIG. 1, the engine ECU 10 directly receives information from the transmission device 2. The engine ECU 10 can alternatively receive gear positional information on the transmission device 2 outputted from the transmission ECU through the onboard LAN 12, for example.

A service brake configuring the braking system includes a brake pedal 13, a master cylinder (hereinafter, referred to as the M/C) 14, a brake actuator 15, wheel cylinders (hereinafter, referred to as the W/Cs) 16FL to 16RR, calipers 17FL to 17RR, disc rotors 18FL to 18RR, and the like. The service brake is controlled by the brake ECU 19 serving as a brake control means.

Specifically, when the brake pedal 13 is pressed and operated, brake fluid pressure is generated in the M/C 14 in accordance with a brake operation amount. The brake fluid pressure thus generated is transmitted to the W/Cs 16FL to 16RR through the brake actuator 15. The disc rotors 18FL to 18RR are pinched by the calipers 17FL to 17RR so as to generate braking force. Such a service brake can be in any form if it is configured to automatically pressurize the W/Cs 16FL to 16RR. Exemplified herein as the service brake is a fluid pressure service brake configured to generate W/C pressure from fluid pressure. The service brake can be an electric service brake such as a brake-by-wire configured to electrically generate W/C pressure.

The brake ECU 19 is configured by a known microcomputer including a CPU, a ROM, a RAM, an I/O, and the like. The engine ECU 10 executes various calculation and processing according to programs stored in the ROM and the like to control braking force (brake torque) and control braking force generated at the respective wheels FL to RR. Specifically, the brake ECU 19 receives detection signals from wheel speed sensors 20FL to 20RR provided at the wheels FL to RR, respectively, to calculate various physical quantities such as wheel speed and vehicle body speed, and receives a detection signal from a brake switch 21 to execute brake control in accordance with calculation results of the physical quantities and a brake operation state. The brake ECU 19 receives a detection signal from an M/C pressure sensor 22 and detects M/C pressure.

The brake ECU 19 also executes off-road support control (hereinafter, referred to as OSC) as vehicle control on off roads in accordance with braking force control. Specifically, the brake ECU 19 receives a detection signal from an OSC switch 23 operated by a driver requesting OSC and detection signals from suspension stroke sensors 24FL to 24RR configured to detect a suspension stroke indicative of a change in vehicle load and from an acceleration sensor 25 configured to detect longitudinal acceleration, and executes OSC in accordance with these detection signals. The OSC switch 23 is considered to be pressed basically for off road travel. Similar control is executed also in a case where the OSC switch 23 is pressed on a steeply sloping road or the like. According to FIG. 1, detection signals from the M/C pressure sensor 22 and the acceleration sensor 25 are inputted to the brake ECU 19 through the brake actuator 15. The brake ECU 19 can be alternatively configured to receive detection signals directly from the respective sensors.

The braking and driving systems of the vehicle, to which the vehicle control device according to the present embodiment is applied, are configured as described above. Subsequently described is operation of the vehicle control device configured as described above. The vehicle control device according to the present embodiment also executes regular engine control and brake control as vehicle control similar to those of the conventional technique. Accordingly, described herein is OSC relevant to the characteristics of the present invention along with TRC executed in cooperation with OSC.

OSC is executed when a driver presses the OSC switch 23 to request execution of OSC. The vehicle control device according to the present embodiment executes, as OSC, control satisfying conditions that (1) the vehicle starts or is accelerated in a case where a driver intends to run the vehicle by pressing the accelerator pedal 11, (2) operability is facilitated by executing vehicle control with a single pedal operation action, and (3) the ground-covering properties are improved by executing TRC according to a vehicle travel state, and the like.

The control satisfying the condition (1) is executed to achieve travel according to a driver's intention even if the driver is not used to off road travel or the like, by starting or accelerating the vehicle in accordance with the driver's intention. For example, driving force is increased in accordance with road-surface resistance or increase in driver's operation amount of the accelerator pedal 11.

Driving force is increased in accordance with road-surface resistance under the following condition, for example.

Vehicle travel is disturbed when the vehicle ascends on a steeply sloping road surface or the like. Driving force is thus increased in accordance with a surface gradient. Driving force is increased in accordance with a surface gradient in this manner, so that driving force corresponding to the surface gradient is increased even when the vehicle ascends on a steeply sloping road surface. The vehicle can thus smoothly ascend the sloping road when driving force is increased by driver's accelerator operation. A surface gradient can be calculated in accordance with a known technique, from a gravity acceleration component included in a detection signal from the acceleration sensor 25. An amount of increase in driving force according to such a surface gradient will be referred to as sloping road grade driving force SLOPE in the following description.

TRC is executed to a wheel having an acceleration slip, by applying braking force to a control target wheel so as to inhibit the acceleration slip. Driving force corresponding to the braking force is added to driving force of a different wheel so as to increase driving force. An amount of decrease in driving force due to acceleration slip inhibitory control can thus be added to driving force of the different wheel so as to inhibit decrease in total driving force. Such an amount of increase in driving force to be added to driving force of a different wheel in correspondence with an amount of decrease in driving force of a control target wheel due to TRC will be referred to as slip corresponding driving force VWSLIP in the following description.

In this case, driving force can be increased in correspondence with surface friction force decreased by a slip (hereinafter, referred to as surface μ). In a case where an acceleration slip is generated, the acceleration slip is inhibited by generating braking force at an inhibitory control target wheel by TRC. The acceleration slip is not entirely cancelled but is generated to some extent. Driving force is thus increased in correspondence with the surface μ decreased by the slip. Driving force corresponding to the surface μ decreased by the slip can thus be added to driving force of a different wheel so as to inhibit decrease in total driving force.

In a case where a wheel is decreased in road surface grounding load by vehicle load shift between wheels, driving force of the different wheel can be similarly increased by an amount of decrease in driving force due to the decrease in road surface grounding load. Driving force decreased by the decrease in road surface grounding load can thus be added to driving force of the different wheel so as to inhibit decrease in total driving force. A change in grounding load due to load shift between wheels can be detected in accordance with detection signals from the suspension stroke sensors 24FL to 24RR. Out of increase in driving force corresponding to an amount of decrease in braking force due to an acceleration slip, increase in driving force corresponding to the surface μ decreased by a slip, and increase in driving force corresponding to a change in grounding load, either one can be selectively executed or some can be simultaneously executed in combination.

It is possible to further increase driving force in accordance with feedback of vehicle body speed. Specifically, target speed corresponding to engine output according to an operation amount of the accelerator pedal 11 is calculated as engine target threshold speed. Feedback control is executed such that actual vehicle body speed approaches the target speed in accordance with a deviation from the vehicle body speed. Feedback control has only to be in a conventional ordinary form, and examples thereof include PID control. An amount of increase in driving force according to the feedback of vehicle body speed will be referred to as feedback driving force V0FB in the following description.

Driving force is increased in accordance with increase in driver's operation amount of the accelerator pedal 11 under the following condition or the like.

Engine target threshold speed is initially set in accordance with the operation amount of the accelerator pedal 11. The engine target threshold speed is increased as the operation amount of the accelerator pedal 11 is larger. It is not preferred to increase target speed beyond necessity during off road travel with OSC being executed. The engine target threshold speed according to the operation amount of the accelerator pedal 11 is set preferably within a range not more than predetermined speed (e.g. 6 km/h).

Driving force is alternatively increased in accordance with an accelerator open degree. Specifically, the degree of a driver's acceleration request is considered to be higher as the accelerator open degree is larger. Feedforward control is thus executed to increase an amount of increase in driving force as the accelerator open degree is larger. Driving force can be generated in more accordance with the driver's acceleration request. Such increase in driving force according to an accelerator open degree will be referred to as accelerator corresponding driving force ACC_FORCE in the following description.

In a case where vehicle body speed approaches the engine target threshold speed even with a high accelerator open degree, the vehicle travels at desired speed and increase in driving force is considered to be unnecessary. The accelerator corresponding driving force ACC_FORCE is thus preferably decreased in accordance with increase in vehicle body speed.

OSC is continuously executed even when the vehicle is stopped in accordance with operation to the brake pedal 13. In this case, driving force is reduced in correspondence with an amount of braking force according to an operation amount of the brake pedal 13. The sloping road grade driving force SLOPE is to be generated in a case where the vehicle stops on a sloping road. If the brake pedal 13 is pressed and braking force is generated, the vehicle does not shift downward even when driving force is decreased in correspondence with the amount of the braking force. In a case where braking force is generated in accordance with operation to the brake pedal 13 while the vehicle stops, driving force is decreased in correspondence with the amount of the braking force so as to achieve improvement in fuel economy. An amount of decrease in driving force according to operation to the brake pedal 13 will be referred to as brake corresponding driving force FOOTBRAKE in the following description.

The control satisfying the condition (2) is executed to prevent a difference between a driver's intention and acceleration or deceleration of a vehicle as in such a case where the vehicle travels excessively after running over an obstacle or a case where the vehicle accelerates on a steeply descending road. Because the vehicle travel state changes constantly during off road travel or the like, a driver is unlikely to appropriately execute accelerator operation or brake operation. The vehicle does not behave in accordance with a driver's intention if the driver drives the vehicle in a manner of driving on a flat road. The control satisfying the condition (2) is thus executed to control the vehicle so as to travel at speed intended by the driver by simpler operation. For example, the vehicle is made to decelerate if the driver weakens accelerator operation, and the vehicle is made to decelerate if the driver performs brake operation at least slightly.

The vehicle is decelerated when the vehicle suddenly accelerates with no change in accelerator operation or when accelerator operation is weakened, so as to achieve quick deceleration without switching from the accelerator pedal 11 to the brake pedal 13.

The vehicle occasionally accelerates suddenly with no change in accelerator operation in such a case where the vehicle has run over an obstacle or a case where the road changes to a steeply descending road. In order to cope with such a case, engine target threshold speed according to the accelerator open degree is calculated and brake control is executed when the vehicle accelerates suddenly, so as to inhibit sudden acceleration and increase speed gradually. Specifically, the vehicle target speed is provided with an upper limit value guard so as to prevent sudden acceleration of the vehicle against a driver's intention. The vehicle target speed to be guarded by the upper limit value is set as OSC brake target threshold speed separately from the engine target threshold speed, so that braking force is generated through brake control when the vehicle body speed reaches the OSC brake target threshold speed.

When accelerator operation is weakened, a driver is considered to intend to decelerate the vehicle. Target deceleration is set in accordance with an accelerator restoring amount and the OSC brake target threshold speed is set in consideration of the target deceleration. In a case where accelerator restoring operation is performed to suddenly restore the accelerator pedal 11, the target deceleration is set to a large value so as to provide a predetermined time period T with the large target deceleration (hereinafter, this period is referred to as a large deceleration period T). This large deceleration period T can be fixed to a constant time period, or can be set to be long in accordance with speed of the accelerator restoring operation or the like. It is thus possible to achieve large deceleration corresponding to the accelerator restoring operation. The large deceleration period T is set in a case where accelerator operation is cancelled and restoring operation is performed in the present embodiment. The large deceleration period T can be alternatively set to have larger deceleration in a case where accelerator restoring operation is performed suddenly, e.g. when an accelerator restoring amount per unit time period is larger than a threshold, in comparison to another case where the accelerator restoring amount per unit time period is smaller than the threshold.

The target deceleration is set in accordance with an IDLE ON time period in which accelerator operation is stopped into an OFF state and engine output comes into an idle state (hereinafter, referred to as IDLE ON), and the OSC brake target threshold speed is set in consideration of the target deceleration. The large deceleration period T is provided in a case where sudden accelerator restoring operation is performed to come into an IDLE ON state, for example. After the IDLE ON time period reaches the large deceleration period T, regular target deceleration is set to be smaller than the target deceleration set upon sudden accelerator restoring operation. The OSC brake target threshold speed is set in accordance with the target deceleration thus set.

In contrast, the vehicle is made to decelerate also in a case where brake operation is performed at least slightly, or a case where a driver presses the brake pedal 13 at least slightly. Vehicle body speed is decelerated slowly if neither accelerator operation nor brake operation is performed. In contrast, a driver is considered to feel insufficient deceleration if brake operation is performed at least slightly. If brake operation is performed at least slightly, the target deceleration is set to be accordingly larger than a case of the IDLE ON state and the OSC brake target threshold speed is set in consideration of the target deceleration thus set.

The target deceleration is increased in accordance with brake operation by a driver. In a case where vehicle deceleration becomes less than the target deceleration due to the fact that a driver strongly presses the brake pedal 13 or a descending road is suddenly decreased in surface gradient, the target deceleration is set to follow the vehicle body speed and the OSC brake target threshold speed is decreased to the vehicle body speed. It is thus possible to prevent a large difference between the vehicle body speed and the OSC brake target threshold speed when the vehicle deceleration becomes lower than the target deceleration.

The control satisfying the condition (3) is performed to correct a brake control amount in accordance with the vehicle travel state during off road travel or the like. The brake control amount and target speed as a TRC control threshold are switched in accordance with the vehicle body speed and a monitoring time period. The TRC target speed is a threshold for determination of braking force application for acceleration slip inhibition, and is set to a value obtained by adding slip speed to the vehicle body speed. If wheel speed of a driving wheel exceeds the target speed, braking force is applied to the driving wheel to inhibit the acceleration slip. The target speed of TRC will be hereinafter referred to as TRC brake target threshold speed.

For example, a driver tends to excessively press the accelerator during off road travel or the like, and a slip may be generated at a wheel and TRC may be executed. In this case, there are a travel state in which the ground-covering properties are improved by transmitting driving force from a slipping wheel to a different wheel and a travel state in which the slip stops and braking force is excessively applied to decrease vehicle body speed V0 and deteriorate the ground-covering properties. The former is regarded as a travel state with a lower degree of the stall prevention request and the latter is regarded as a travel state with a higher degree of the stall prevention request. Accordingly, the brake control amount is corrected in accordance with the degree of the stall prevention request so as to be matched to a travel state.

Specifically, a vehicle travelling at low vehicle body speed often travels on a road surface of high travel difficulty with a small degree of the stall prevention request. In this case, stronger wheel slip inhibitory control by brake control is thus executed to exert a limited-slip differential (LSD (differential gear unit)) effect, improve the ground-covering properties, and generate more deceleration, so that safety can be enhanced. In other words, the TRC brake target threshold speed is switched in accordance with the vehicle body speed. If the vehicle body speed increases, it is considered that the vehicle has left a place of high travel difficulty and the degree of the stall prevention request is high. Switching is thus performed to reduce the brake control amount, so as to prevent failing to reach speed requested by a driver due to generation of large braking force under a condition where the driver intends to drive faster. Such control according to vehicle body speed is achieved by setting, in accordance with the vehicle body speed, a first brake coefficient TB1 referred to for setting of a TRCbrake correction coefficient TB as a correction coefficient to be multiplied to the brake control amount of TRC and a first threshold TV1 referred to for setting of slip speed TV, as to be described later.

If the brake control amount and the TRC brake target threshold speed are switched frequently, variation in brake control amount or the like is large due to the switching. A predetermined monitoring time period is thus set to reduce the variation or the like. The brake control amount and the TRC brake target threshold speed are switched if a switching condition is satisfied during the monitoring time period. For example, the switching is performed if the switching condition is satisfied during the predetermined monitoring time period set to one second.

The brake control amount and the TRC brake target threshold speed are alternatively switched in accordance with the accelerator open degree. Specifically, the brake control amount is increased because driving force is large at the beginning of pressing the accelerator pedal 11. If the accelerator pedal 11 is pressed continuously, a slip amount due to acceleration increases and braking force increases excessively. The brake control amount is thus made smaller than that at the beginning of the pressing operation. Such control according to the accelerator open degree is achieved by setting, in accordance with the accelerator open degree, a TRC brake coefficient correction value TBK referred to for setting of the TRCbrake correction coefficient TB and a TRC threshold correction value TVK referred to for setting of the slip speed TV.

The brake control amount and the TRC brake target threshold speed are alternatively switched in accordance with road-surface resistance. With high road-surface resistance, the vehicle tends to stall when braking force is generated by brake control. The brake control amount is thus made smaller than that for a road surface with small road-surface resistance. The road-surface resistance is high in a case where the vehicle is travelling on a desert road, a muddy road, or the like. In this case, the vehicle tends to stall if braking force is generated. Such control according to road-surface resistance is achieved by setting, in accordance with the road-surface resistance, a second brake coefficient TB2 referred to for setting of the TRCbrake correction coefficient TB and a TRC threshold TV2 referred to for setting of the slip speed TV.

As described above, the control satisfying the conditions (1) to (3) is executed upon execution of OSC. TRC and the like are executed regularly even in a case where OSC is not executed. Various values relevant to TRC are set depending on whether or not OSC is executed. OSC and TRC are executed in this manner.

Subsequently described in detail is OSC executed as described above. FIGS. 2A and 2B and 2C are flowcharts of the entire OSC including the TRC. The brake ECU 19 executes the processing in the flowcharts in these figures at every predetermined control cycle. OSC will be described in detail below with reference to these figures.

Various input processing is executed initially in step 100. Specifically, the brake ECU 19 receives detection signals from the respective wheel speed sensors 20FL to 20RR and a detection signal from the acceleration sensor 25, and calculates wheel speed VW of each of the wheels FL to RR and vehicle longitudinal acceleration Gx. A suffix  in the wheel speed VW indicates any one of the signs FL to RR, and the sign VW totally indicates wheel speed of a corresponding one of the wheels FL to RR. The suffix ** will similarly indicate any one of the signs FL to RR in the following description.

The brake ECU 19 receives a detection signal from the M/C pressure sensor 22 and detects M/C pressure, as well as receives detection signals from the suspension stroke sensors 24FL to 24RR and detects a stroke of the suspension, so as to detect a change in load of the vehicle. The brake ECU 19 also receives an engine open degree, driving force, and a gear position of the auxiliary transmission 2b, particularly whether a position H4 or a position L4, from the engine ECU 10 and the like through the onboard LAN 12. The brake ECU 19 further receives a detection signal from the OSC switch 23 and detects whether or not a driver is requesting OSC.

The flow then proceeds to step 105, and the brake ECU 19 determines whether or not a condition for execution of OSC is satisfied, particularly, whether or not the gear position of the auxiliary transmission 2b is at the position L4 to set a gear ratio in low gear for an off road or the like and whether or not the OSC switch 23 is ON. If positive determination is made, the condition for execution of OSC is satisfied, so that the flow proceeds to step 110 and the brake ECU 19 sets a flag indicating OSC control permission. In contrast, if negative determination is made, the condition for execution of OSC is not satisfied, so that the flow proceeds to step 115 and the brake ECU 19 sets a flag indicating OSC control prohibition.

The flow subsequently proceeds to step 120 and the brake ECU 19 calculates vehicle body speed V0 from each wheel speed VW and calculates a slip ratio Sratio expressed as a deviation between each wheel speed VW and the vehicle body speed V0 (=(VW−V0)/V0). The flow further proceeds to step 125 and the brake ECU 19 differentiates the vehicle body speed V0 by time to calculate vehicle body acceleration V0'. The flow then proceeds to step 130 and the brake ECU 19 calculates the sloping road grade driving force SLOPE. A difference between the vehicle body acceleration V0' and the vehicle longitudinal acceleration Gx calculated from the detection signal of the acceleration sensor 25 in step 100 corresponds to the gravity acceleration component. The brake ECU 19 calculates a surface gradient $\theta$ in accordance with an operational expression of surface gradient $\theta=\sin^{-1}\{(Gx-V0')/9.8\}$. In accordance with the calculation result, the brake ECU 19 calculates the sloping road grade driving force SLOPE required for preventing downward shift of the vehicle at the surface gradient $\theta$.

The flow then proceeds to step 135 and the brake ECU 19 calculates the brake corresponding driving force FOOTBRAKE. The M/C pressure calculated in accordance with the M/C pressure sensor 22 in step 100 corresponds to the operation amount of the brake pedal 13. The brake ECU 19 thus calculates braking force due to operation of the brake pedal 13 from the M/C pressure. The braking force thus calculated is regarded as the brake corresponding driving force FOOTBRAKE.

The flow then proceeds to step 140 and the brake ECU 19 determines whether or not OSC control prohibition is set. If negative determination is made, the flow proceeds to step 145 and the brake ECU 19 calculates the engine target threshold speed corresponding to engine output according to the accelerator operation amount of OSC. As described above, the engine target threshold speed has a value of a target speed for execution of feedback control. The engine target threshold speed is calculated from an accelerator opening rate (%) as a rate of an accelerator open degree.

FIG. 3 is a chart illustrating a method of setting the engine target threshold speed. Temporary engine target threshold speed is denoted by TVEtmp1 whereas actually set engine target threshold speed is denoted by TVE. FIG. 4 is a map of the relation between the accelerator opening rate and the temporary engine target threshold speed TVEtmp1.

As depicted in FIG. 4, the engine target threshold speed TVEtmp1 corresponding to the accelerator opening rate is obtained. The engine target threshold speed TVEtmp1 has a larger value as the accelerator opening rate increases so as to be in proportion to the accelerator opening rate. During off road travel or the like with OSC being executed, the vehicle possibly travels excessively when running over a projecting road with driving force generated in accordance with a large operation amount of the accelerator pedal 11. The temporary engine target threshold speed TVEtmp1 is thus preferred to be suppressed to a value of a certain degree. The temporary engine target threshold speed TVEtmp1 is thus provided with an upper limit value in the present embodiment so as to be limited to the upper limit value if the accelerator opening rate exceeds a predetermined threshold (40% in FIG. 4).

As depicted in FIG. 3, the engine target threshold speed is set to 0 km/h in a braking state. If the temporary engine target threshold speed TVEtmp1 is larger than the engine target threshold speed TVE set at the previous control cycle, the engine target threshold speed TVE at the current control cycle is set to a value obtained by adding constant acceleration (0.03 G in FIG. 3) to the engine target threshold speed TVE set at the previous control cycle. If the temporary engine target threshold speed TVEtmp1 is not larger than the engine target threshold speed TVE set in the braking state or at the previous control cycle, the temporary engine target threshold speed TVEtmp1 is set as engine target threshold speed TVE at the current control cycle. Priority levels are provided in the order of 1 to 3. If the conditions are matched, the engine target threshold speed TVE at the current control cycle is set in the order of the priority levels. The engine target threshold speed TVE at the current control cycle is set in this manner.

The flow subsequently proceeds to step 150 and the brake ECU 19 calculates accelerator operation amount requested driving force. The accelerator operation amount requested driving force is driving force required for execution of the control satisfying the condition (1), and has a value obtained from the sloping road grade driving force SLOPE, the slip corresponding driving force VWSLIP, the feedback driving force V0FB, the accelerator corresponding driving force ACC_FORCE, and the brake corresponding driving force FOOTBRAKE. The accelerator operation amount requested driving force is calculated as an engine requested value in this case.

FIG. 5 is a flowchart of detailed processing of calculating the accelerator operation amount requested driving force.

Initially in step 200, temporary requested driving force ACC_REQ is obtained from the accelerator opening rate (%) as a rate of an accelerator open degree. The temporary requested driving force ACC_REQ is driving force corresponding to the accelerator operation amount but has a value in no consideration of increase in driving force and the like due to a surface gradient, a slip, and the like described above. The relation between the accelerator opening rate and the temporary requested driving force ACC_REQ is preliminarily obtained through simulation or the like, and the temporary requested driving force ACC_REQ is increased as the accelerator opening rate increases, for example. During off road travel or the like with OSC being executed, the vehicle possibly travels excessively when running over a projecting road with driving force generated in accordance with a large operation amount of the accelerator pedal 11. The temporary requested driving force ACC_REQ is thus preferred to be suppressed to a value of a certain degree. The temporary requested driving force ACC_REQ is thus provided with an upper limit value in the present embodiment so as to be limited to the upper limit value if the accelerator opening rate exceeds a predetermined threshold (40% in FIG. 5).

The flow subsequently proceeds to step 205 and a requested driving correction coefficient ACC_RATIO is obtained. The requested driving correction coefficient ACC_RATIO is a coefficient for correction of the accelerator corresponding driving force ACC_FORCE in accordance with the vehicle body speed V0. The requested driving force is increased as the operation amount of the accelerator pedal 11 is larger. It is not preferred to increase the requested driving force beyond necessity during off road travel with OSC being executed. Assuming that the requested driving correction coefficient ACC_RATIO is 1 while the vehicle stops (the vehicle body speed V0=0 km/h), the requested driving correction coefficient ACC_RATIO is decreased linearly until the vehicle body speed V0 reaches predetermined speed (e.g. 6 km/h). In other words, it is determined that the vehicle has run over an obstacle for travel or the like once the vehicle starts travelling, and the requested driving correction coefficient ACC_RATIO is decreased so as to decrease the accelerator corresponding driving force ACC_FORCE. The requested driving correction coefficient ACC_RATIO is set to 0 if the vehicle body speed V0 exceeds predetermined speed, in order to inhibit the vehicle body speed V0 from exceeding the predetermined speed.

The flow then proceeds to step 210, and the accelerator corresponding driving force ACC_FORCE is calculated by multiplying the temporary requested driving force ACC_REQ calculated in step 200 and the requested driving correction coefficient ACC_RATIO.

The flow subsequently proceeds to step 215 and an engine requested value ENG_REQ corresponding to the accelerator operation amount requested driving force is calculated. Specifically, the engine requested value ENG_REQ is calculated by adding the sloping road grade driving force SLOPE, the slip corresponding driving force VWSLIP, the feedback driving force V0FB, and the accelerator corresponding driving force ACC_FORCE and subtracting the brake corresponding driving force FOOTBRAKE from the added result.

For example, the sloping road grade driving force SLOPE is set to the value obtained in step 130 in FIGS. 2A and 2C.

Because TRC is executed in accordance with the slip ratio Sratio calculated in step 120 in FIGS. 2A and 2C, as to the slip corresponding driving force VWSLIP, braking force for inhibition of an acceleration slip calculated in TRC is inputted to be referred to as an amount of decrease in driving force of a control target wheel. In a case where the vehicle does not execute TRC, driving force corresponding to the surface μ decreased due to a slip is obtained simply from the slip ratio, as the slip corresponding driving force VWSLIP. Grounding loads of the respective wheels can be obtained from detection signals of the suspension stroke sensors 24FL to 24RR inputted in step 100 in FIGS. 2A and 2C**, and an amount of decrease in driving force corresponding to decrease in grounding load due to load shift between wheels can be calculated to be referred to as the slip corresponding driving force VWSLIP. Specifically, the slip corresponding driving force VWSLIP can be obtained by calculating driving force transmittable from each of the wheels to a road surface from the grounding load of the corresponding wheel, and adding, if driving force applied to any one of the wheels exceeds the transmittable driving force, the exceeding amount of the driving force.

Referred to as the feedback driving force V0FB is an amount of increase in driving force calculated by feedback control so as to cause the vehicle body speed V0 calculated in steps 120 and 145 in FIGS. 2A and 2C to approach the engine target threshold speed. Referred to as the accelerator corresponding driving force ACC_FORCE is the value obtained in step 210. Referred to as the brake corresponding driving force FOOTBRAKE is the value calculated in step 135 in FIGS. 2A and 2C. Calculated in this manner is the engine requested value ENG_REQ corresponding to the accelerator operation amount requested driving force.

This engine requested value ENG_REQ is transmitted to the engine ECU 10, and engine output is controlled such that the engine requested value ENG_REQ is reflected only in a case where the engine requested value ENG_REQ exceeds driving force set in engine control to generate driving force corresponding to the engine requested value ENG_REQ. It is thus possible to generate driving force required for execution of the control satisfying the condition (1).

The flow then proceeds to step 155 for processing of calculating the OSC brake target threshold speed. As described in the control satisfying the condition (2), the OSC brake target threshold speed is a threshold for generation of braking force due to brake control in a case where the vehicle body speed increases. FIG. 6 is a flowchart of processing of calculating the OSC brake target threshold speed. The processing of calculating the OSC brake target threshold speed will be described in detail with reference to this figure.

Initially calculated in step 300 is first brake target threshold speed TVBtmp1 to be set temporarily. Set in this case as the first brake target threshold speed TVBtmp1 is a smaller one of OSC brake target threshold speed TVB set at the previous control cycle and the vehicle body speed V0 at the current control cycle. Considered in this case are the OSC brake target threshold speed TVB set at the previous control cycle as well as the vehicle body speed V0. Accordingly, as to be described later, the brake target threshold speed TVB can decrease in conformity with the vehicle body speed V0 in a case where the vehicle body speed V0 is suddenly decreased by brake operation to become lower than the brake target threshold speed TVB.

The flow then proceeds to step 305 and second brake target threshold speed TVBtmp2 is set temporarily. FIG. 7 is a chart illustrating a method of setting the second brake target threshold speed TVBtmp2.

Various conditions are set as in FIG. 7, and the second brake target threshold speed TVBtmp2 is set in accordance with the various conditions. Similarly to the engine target threshold speed TVE, priority levels are provided in the order of 1 to 6. If the conditions are matched, the second brake target threshold speed TVBtmp2 at the current control cycle is set in the order of the priority levels.

Initially, in a state where backup control is executed and the vehicle body speed is less than 10 km/h, the second brake target threshold speed TVBtmp2 is set to a value obtained by increasing the brake target threshold speed TVB at the previous control cycle by first acceleration (0.025 G in this case). Backup control is executed in a case where OSC is cancelled in view of fail-safe due to generation of some trouble or a case where the OSC switch 23 is OFF. The second brake target threshold speed TVBtmp2 is set in accordance with the vehicle body speed V0 in this case. In a state where the vehicle body speed V0 is not less than 10 km/h, the second brake target threshold speed TVBtmp2 has a value obtained by increasing the brake target threshold speed TVB at the previous control cycle by second acceleration (0.05 G in this case) larger than the first acceleration.

If the accelerator operation is performed, accelerator acceleration ACCEL_G according to the accelerator opening rate is calculated, and the brake target threshold speed TVB is calculated by adding the accelerator acceleration ACCEL_G and the previous brake target threshold speed TVB (TVB+ACCEL_G). The accelerator acceleration ACCEL_G is calculated in accordance with the relation between the accelerator opening rate (%) and the accelerator acceleration ACCEL_G indicated in FIG. 8.

Specifically, a map indicating that the accelerator acceleration ACCEL_G increases as the accelerator opening rate is larger is obtained preliminarily through simulation or the like, and the accelerator acceleration ACCEL_G corresponding to the accelerator opening rate is calculated with reference to the map. During off road travel or the like with OSC being executed, the vehicle possibly travels excessively when running over a projecting road with driving force generated in accordance with a large operation amount of the accelerator pedal 11. The accelerator acceleration ACCEL_G is thus preferred to be suppressed to a value of a certain degree. The accelerator acceleration ACCEL_G is thus provided with an upper limit value in the present embodiment so as to be limited to the upper limit value if the accelerator opening rate exceeds a predetermined threshold (45% in FIG. 8).

The second brake target threshold speed TVBtmp2 is set under these conditions with reference to the brake target threshold speed TVB at the previous control cycle with no reference to the first brake target threshold speed TVBtmp1. If the vehicle body speed V0 at the current control cycle is low, the vehicle body speed V0 is set to the first brake target threshold speed TVBtmp1 and the second brake target threshold speed TVBtmp2 is set with reference to the vehicle body speed V0. In this case, the amount of feedback is too small and the brake target threshold speed TVB cannot be changed quickly.

In a case where accelerator operation is cancelled and the vehicle is brought into a braking state, the vehicle is decelerated with relatively large target deceleration (e.g. 0.1 G). Specifically, the second brake target threshold speed TVBtmp2 is set such that the vehicle is decelerated with predetermined deceleration in accordance with brake operation if applicable.

Also in a case where the IDLE ON time period is less than the large deceleration period T, the vehicle is decelerated with relatively large target deceleration (e.g. 0.1 G). Specifically, if accelerator restoring operation is performed suddenly, the target deceleration is set to a large value and the target deceleration is set until the large deceleration period T elapses. The second brake target threshold speed TVBtmp2 is set in accordance with the target deceleration.

If none of the above conditions is satisfied, the second brake target threshold speed TVBtmp2 is set such that the vehicle is decelerated with relatively small target deceleration (e.g. 0.025 G). This applies to a state where neither IDLE ON operation nor brake operation is performed and the large deceleration period T has elapsed. Preferably, the large deceleration period T can be made variable in accordance with accelerator close grade speed corresponding to the accelerator restoring amount per unit time period, such that the large deceleration period T is made longer as the accelerator close grade speed is larger in accordance with the relation between the accelerator close grade speed and the large deceleration period T as indicated in FIG. 9 or the like. The large deceleration period T can thus be set to be long in the case where the accelerator restoring amount is large.

The second brake target threshold speed TVBtmp2 is set in this manner. The flow subsequently proceeds to step 310 and third brake target threshold speed TVBtmp3 is set temporarily. The third brake target threshold speed TVBtmp3 is set by selecting a smaller one of the second brake target threshold speed TVBtmp2 set in step 305 and a value obtained by adding a speed upper limit value ACCEL_UP calculated from the accelerator operation amount to the vehicle body speed V0 at the current control cycle. As described above, because the second brake target threshold speed TVBtmp2 is set with reference to the first brake target threshold speed TVBtmp1 or the brake target threshold speed TVB at the previous control cycle, the second brake target threshold speed TVBtmp2 is occasionally set to a value largely different from a value estimated in consideration of the vehicle body speed V0 and the accelerator operation amount. Accordingly, a value obtained by adding the speed upper limit value ACCEL_UP to the vehicle body speed V0 is set as an upper limit value, and the third brake target threshold speed TVBtmp3 is set with an upper limit guard. The speed upper limit value ACCEL_UP is calculated in accordance with the relation between the accelerator opening rate (%) and the speed upper limit value ACCEL_UP indicated in FIG. 10.

Specifically, a map indicating that the speed upper limit value ACCEL_UP increases as the accelerator opening rate is larger is obtained preliminarily through simulation or the like, and the speed upper limit value ACCEL_UP corresponding to the accelerator opening rate is calculated with reference to the map. The speed upper limit value ACCEL_UP is also provided with an upper limit value in this case so as to be limited to the upper limit value if the accelerator opening rate exceeds a predetermined threshold (60% in FIG. 10). Accordingly, if the vehicle body speed V0 increases in correspondence with accelerator operation, the vehicle body speed V0 is increased with the upper limit guard of the speed upper limit value ACCEL_UP so as not to exceed its increasing grade.

The flow subsequently proceeds to step 315 and a larger one of the third brake target threshold speed TVBtmp3 and predetermined lower limit speed (0.8 km/h in FIG. 6) is set as a final value of the brake target threshold speed TVB. The third brake target threshold speed TVBtmp3 is calculated in accordance with the various conditions described above. The brake target threshold speed TVB is provided with a lower limit value guard so that the vehicle can travel at not less than predetermined lower limit speed even if the third brake target threshold speed TVBtmp3 is less than the lower limit speed. The brake target threshold speed TVB is set in this manner.

The flow subsequently proceeds to step 160 and various values are calculated, including the TRC brake target threshold speed and the TRCbrake correction coefficient TB as a correction coefficient to be multiplied to the brake control amount of TRC. The TRC brake target threshold speed has a value obtained by adding the slip speed TV to the vehicle body speed V0 having a variable value. It is thus assumed in this case that the TRC brake target threshold speed is calculated by setting the slip speed TV.

Methods of calculating the TRC brake target threshold speed and the TRCbrake correction coefficient TB will now be described with reference to FIGS. 11 to 13.

The first brake coefficient TB1, the first threshold TV1, and the like are initially set with reference to FIG. 11. FIG. 11 is a chart of the relation among the vehicle body speed V0 along with various conditions, the first brake coefficient TB1, and the first threshold TV1. The brake control amount of OSC along with TRC is also corrected in correspondence with the vehicle body speed V0. FIG. 11 refers to an OSCbrake correction coefficient CB as a correction coefficient of the brake control amount of OSC.

As indicated in this figure, the first brake coefficient TB1, the first threshold TV1, and the OSCbrake correction coefficient CB as the correction coefficient of the brake control amount of OSC are set basically in accordance with the vehicle body speed V0. Specifically, the first brake coefficient TB1 and the OSCbrake correction coefficient CB are decreased and the first threshold TV1 is increased as the vehicle body speed V0 increases.

The vehicle often travels on a road surface of high travel difficulty at the vehicle body speed V0 of 0 km/h in a state where the vehicle is not in a braking state, in other words, a state where a driver intends to run the vehicle but the vehicle stops. Therefore, the first brake coefficient TB1 is set to a large value and the first threshold TV1 is set to a small value in order for stronger wheel slip inhibitory control by brake control. The brake control amount of TRC can be increased by setting the first brake coefficient TB1 to a large value. The slip speed TV defining the TRC brake target threshold speed is decreased by setting the first threshold TV1 to a small value. Accordingly, TRC can be executed more easily. The brake control amount of OSC is also set to a large value when the vehicle body speed V0 is 0 km/h, for stronger wheel slip inhibitory control by brake control.

If the brake control amount and the TRC brake target threshold speed are switched frequently, variation in brake control amount or the like is large due to the switching. In order to reduce the variation, the first brake coefficient TB1, the first threshold TV1, and the OSCbrake correction coefficient CB are switched in the case where the above conditions are satisfied for a predetermined monitoring time period (one second in this case).

The first brake coefficient TB1 and the OSCbrake correction coefficient CB are decreased and the first threshold TV1 is increased as the vehicle body speed V0 increases. Priority levels are provided in the order of 1 to 5 for each of the conditions. If the conditions indicated in FIG. 11 are matched, the first brake coefficient TB1, the first threshold TV1, and the OSCbrake correction coefficient CB are set in the order of the priority levels.

The TRC brake coefficient correction value TBK and the TRC threshold correction value TVK are set with reference to FIG. 12. FIG. 12 is a map of the relation of the TRC brake coefficient correction value TBK and the TRC threshold correction value TVK to the accelerator opening rate (%).

As indicated in this figure, driving force increases in a case where the accelerator opening rate is small at the beginning of pressing the accelerator pedal 11 or the like. Accordingly, the TRC brake coefficient correction value TBK is increased in order to increase the brake control amount. If the accelerator pedal 11 is pressed continuously and the accelerator opening rate increases, a slip amount due to acceleration increases and braking force increases excessively. The TRC brake coefficient correction value TBK is thus decreased in order to decrease the brake control amount from the amount at the beginning of the pressing operation. As to the TRC threshold correction value TVK, an allowable amount of an acceleration slip is increased as the accelerator opening rate increases, so that braking force due to TRC is unlikely to be generated and the brake control amount is decreased.

The second brake coefficient TB2 and the TRC threshold TV2 are set with reference to FIG. 13. FIG. 13 is a map of the relation of the second brake coefficient TB2 and the TRC threshold TV2 to road-surface resistance.

As depicted in this figure, the second brake coefficient TB2 and the TRC threshold TV2 are made variable in accordance with road-surface resistance. Specifically, the second brake coefficient TB2 is set to a larger value with smaller road-surface resistance and is set to a smaller value with high road-surface resistance. The second brake coefficient TB2 is referred to for setting of an upper limit value upon setting the TRCbrake correction coefficient TB serving as a correction coefficient of the brake control amount of TRC. A vehicle tends to stall on a road surface having high road-surface resistance when braking force is generated. The TRCbrake correction coefficient TB is provided with an upper limit value guard by setting an upper limit value according to the road-surface resistance by the second brake coefficient TB2 so as to inhibit increase in brake control amount of TRC in spite of a road surface state easily causing stall.

On the other hand, the TRC threshold TV2 is set to a smaller value with smaller road-surface resistance and is set to a larger value with higher road-surface resistance. The TRC threshold TV2 is used for setting of a lower limit value upon setting the slip speed TV of TRC. A vehicle tends to stall on a road surface having high road-surface resistance when braking force is generated. The slip speed TV is provided with a lower limit value guard by setting a lower limit value according to the road-surface resistance with reference to the TRC threshold TV2 so as to inhibit generation of braking force due to TRC in spite of a road surface state easily causing stall.

In this manner, when the first brake coefficient TB1, the first threshold TV1, the OSCbrake correction coefficient CB, the TRC brake coefficient correction value TBK, the TRC threshold correction value TVK, the second brake coefficient TB2, and the TRC threshold TV2 are set with reference to FIGS. 11 to 13, the TRC brake target threshold speed and the TRCbrake correction coefficient TB are calculated from these values.

The TRC brake target threshold speed is calculated by adding the slip speed TV to the vehicle body speed V0 at the current control cycle. The slip speed TV is set by selecting a larger one of MAX(TV1+TVK, TV2), a value obtained by adding the TRC threshold correction value TVK to the first threshold TV1 and the TRC threshold TV2. The TRC brake target threshold speed is thus set by adding the slip speed TV set by MAX(TV1+TVK, TV2) to the vehicle body speed V0. In contrast, the TRCbrake correction coefficient TB is set by selecting a smaller one of MIN(TB1×TBK, TB2), a value obtained by multiplying the first brake coefficient TB1 by the TRC brake coefficient correction value TBK, and the second brake coefficient TB2.

The slip speed TV is basically set as a value obtained by adding the TRC threshold correction value TVK set in accordance with the accelerator opening rate to the first threshold TV1 set in accordance with the vehicle body speed V0. The TRCbrake correction coefficient TB is also basically set as a value obtained by multiplying the first brake coefficient TB1 set in accordance with the vehicle body speed V0 by the TRC brake coefficient correction value TBK set in accordance with the accelerator opening rate.

In the case where the vehicle is travelling on a road surface of high travel difficulty as in the case where the vehicle body speed V0 is low, stronger wheel slip inhibitory control by brake control is executed to exert the LSD effect, improve the ground-covering properties, and generate more deceleration, so that safety can be enhanced. If the vehicle body speed V0 increases and the vehicle has left a place of high travel difficulty, switching is performed to reduce the brake control amount, so as to prevent generation of large braking force under a condition where the driver intends to drive faster and to achieve speed requested by the driver.

The brake control amount can be increased when the accelerator opening rate is large and driving force is increased at the beginning of pressing the accelerator pedal 11, for example. If the accelerator pedal 11 is pressed continuously and the slip amount due to acceleration increases, the brake control amount can be made smaller than that at the beginning of the pressing operation.

Because the vehicle tends to stall with high road-surface resistance, the slip speed TV is provided with a lower limit value guard by the TRC threshold TV2 set in accordance with the degree of road-surface resistance. Accordingly, braking force due to TRC is less likely to be generated if road-surface resistance is high. Similarly, the TRCbrake correction coefficient TB is provided with an upper limit value guard by the second brake coefficient TB2 set in accordance with the degree of road-surface resistance. Accordingly, increase in brake control amount of TRC is prevented if road-surface resistance is high.

After the TRC brake target threshold speed and the TRCbrake correction coefficient TB are calculated in this manner, the flow proceeds to step 165 and the TRC brake control amount is calculated. The TRC brake control amount is a brake control amount generated by TRC, and has a value corresponding to braking force generated at a wheel generating an acceleration slip as a control target. In this case, obtained as the TRC brake control amount is  wheel TRC target fluid pressure TTP1 having a fluid pressure converted value of the W/C pressure of a corresponding one of the W/Cs 16FL to 16RR of the control target wheel.

Specifically, the  wheel TRC target fluid pressure TTP1 is calculated by multiplying a deviation between the wheel speed VW** and the TRC brake target threshold speed (=vehicle body speed V0+slip speed TV) by a predetermined gain set by feedback control. A temporary brake control amount of TRC is thus calculated in accordance with the control satisfying the condition (3), specifically, from the slip speed TV set in consideration of the vehicle body speed V0, the accelerator opening rate, and the road-surface resistance.

The flow then proceeds to step 170, and the  wheel TRC target fluid pressure TTP1 calculated in step 165 is multiplied by the TRCbrake correction coefficient TB. The  wheel TRC target fluid pressure TTP1 is thus corrected in accordance with the control satisfying the condition (3), specifically, by the TRCbrake correction coefficient TB set in consideration of the vehicle body speed V0, the accelerator opening rate, and the road-surface resistance, and  wheel TRC final target fluid pressure TTP2 is calculated as the final brake control amount of TRC.

The flow then proceeds to step 175 and it is determined whether or not OSC control prohibition is set as in step 140. If negative determination is made, the flow proceeds to step 180 and an OSC brake control amount is calculated. The OSC brake control amount is a brake control amount generated by OSC, and has a value corresponding to braking force generated at a wheel as a control target. In this case, an OSC target control amount TOB is obtained as a target value of the OSC brake control amount, and  wheel OSC target fluid pressure TOP1 is then obtained with the OSC target control amount TOB serving as a fluid pressure converted value of the W/C pressure of a corresponding one of the W/Cs 16FL to 16RR of the control target wheel.

Specifically, the OSC target control amount TOB is calculated by multiplying a deviation between the vehicle body speed V0 and the OSC brake target threshold speed TVB obtained in step 155 by a predetermined gain set by feedback control. The  wheel OSC target fluid pressure TOP1 is calculated by multiplying the OSC target control amount TOB by a brake fluid pressure conversion coefficient. The OSC target control amount TOB is thus calculated in accordance with the control satisfying the condition (2), specifically, from the OSC brake target threshold speed TVB set in consideration of accelerator operation and brake operation, and the  wheel OSC target fluid pressure TOP1 is calculated by converting the OSC target control amount TOB to fluid pressure. The  wheel OSC target fluid pressure TOP1 can be set as the final value corresponding to the target value of the OSC brake control amount. Alternatively, the  wheel OSC target fluid pressure TOP1 is regarded as a temporary brake control amount of OSC and is corrected in accordance with the vehicle body speed V0.

Specifically, the flow proceeds to step 185, and the  wheel OSC target fluid pressure TOP1 is multiplied by the OSCbrake correction coefficient CB set in step 160 so as to correct the  wheel OSC target fluid pressure TOP1 and calculate  wheel OSC final target fluid pressure TOP2. In this manner, the final brake control amount of OSC is calculated as a value in consideration of the OSCbrake correction coefficient CB set in accordance with the vehicle body speed V0.

The flow then proceeds to step 190 and the final brake control amount in accordance with OSC and TRC is calculated. Specifically, the  wheel TRC final target fluid pressure TTP2 as the final brake control amount of TRC and the  wheel OSC final target fluid pressure TOP2 as the final brake control amount of OSC are added to obtain  wheel target fluid pressure TP (=TTP2+TOP2) as the final brake control amount of the control target wheel. When the final brake control amount of the control target wheel is calculated in this manner, the brake fluid pressure of a corresponding one of the W/Cs 16FL to 16RR of the control target wheel is set as the  wheel target fluid pressure TP by an automatic pressurizing function of the service brake. It is thus possible to generate braking force required for execution of the control satisfying the conditions (2) and (3).

If OSC control prohibition is set and positive determination is made in step 140, the flow proceeds to step 195 and regular TRC with no OSC is executed. In this case, the TRC brake target threshold speed is calculated for regular TRC. Because OSC control is prohibited, the TRCbrake correction coefficient TB is set to 1.0 in a substantially uncorrected state and the TRC brake target threshold speed is calculated for regular TRC as to the slip speed TV. The  wheel OSC final target fluid pressure TOP2 is set to 0 [MPa] and the engine requested value ENG_REQ is set to an unreflected value, such as −10000 [N]. Negative determination is made also in step 175. In step 190, the  wheel target fluid pressure TP as the final brake control amount in accordance with OSC and TRC is set as the  wheel TRC final target fluid pressure TTP2 only in consideration of TRC.

Generated as described above are driving force required for execution of the control satisfying the condition (1) and braking force required for execution of the control satisfying the conditions (2) and (3). FIGS. 14A and 14B and 15A and 15B are timing charts of a case where various processing in the flowcharts in FIGS. 2A and 2B and 2C are executed.

FIGS. 14A and 14B are a timing chart of a case where a travel surface is a mogul road surface (an uneven surface with projections and recesses). Exemplified in this figure is the state where a road surface changes from an ascending mogul road surface, a flat and horizontal road surface, and then a descending road surface.

Initially, in a state where the accelerator pedal 11 is not pressed but the brake pedal 13 is pressed at a time point T0, the priority level 2 in FIG. 11 is selected. The slip speed TV is set in accordance with the selected priority level, and the TRC brake target threshold speed is set as a value obtained by adding the slip speed TV to the vehicle body speed V0 (=0). Although the priority level 4 in FIG. 7 is selected, there is provided a lower limit value guard. The OSC brake target threshold speed is set to the lower limit value (e.g. 0.8 km/h indicated in step 315 in FIG. 6). If brake operation is cancelled at a time point T1 and this state lasts for a predetermined time period (e.g. one second), the priority level 1 in FIG. 11 is selected at a time point T2 and the first threshold TV1 is decreased accordingly. The slip speed TV is thus decreased.

If accelerator operation is then performed at a time point T3, driving force corresponding to the accelerator operation is generated. If the vehicle body speed V0 increases, the engine target threshold speed is accordingly set to predetermined speed (e.g. 2 km/h). The TRC brake target threshold speed and the OSC brake target threshold speed are also increased along with the increasing vehicle body speed V0. As to the OSC brake target threshold speed, the priority level 3 in FIG. 7 is selected and the accelerator acceleration ACCEL_G corresponding to the accelerator opening rate is added. However, a value obtained by adding the speed upper limit value ACCEL_UP to the vehicle body speed V0 is set as an upper limit value. If the accelerator acceleration ACCEL_G is large, the OSC brake target threshold speed is set to the upper limit value.

If the vehicle body speed V0 falls within the speed range indicated in the priority level 2 in FIG. 11 continuously for a predetermined time period (e.g. one second), the priority level 2 in FIG. 11 is selected at a time point T4 and the TRC brake target threshold speed is corrected to a large value.

Subsequently, an acceleration slip is generated at one of the wheels FL to RR immediately after the time point T4. In the case where the wheel speed VW exceeds the TRC brake target threshold speed and the OSC brake target threshold speed, there is set requested braking force for the wheel having the acceleration slip. The requested braking force is required for inhibition of the acceleration slip or prevention of sudden acceleration of the vehicle against a driver's intention. The brake control amount is set in accordance with the requested braking force. This state lasts until the vehicle body speed V0 becomes lower than the TRC brake target threshold speed and the OSC brake target threshold speed. Such behavior is repeated every time an acceleration slip is generated and the wheel speed VW exceeds the TRC brake target threshold speed and the OSC brake target threshold speed.

When the accelerator pedal 11 is further pressed at a time point T5, the engine target threshold speed is increased accordingly. Driving force corresponding to the accelerator operation is generated accordingly, as well as the vehicle body speed V0 increases. The TRC brake target threshold speed and the OSC brake target threshold speed also increase accordingly. In the case where the vehicle body speed V0 falls within the speed range indicated in the priority level 3 in FIG. 11 continuously for a predetermined time period (e.g. one second), the priority level 3 in FIG. 11 is selected at a time point T6 and the TRC brake target threshold speed is corrected to a large value. In the case where the vehicle body speed V0 further increases and falls within the speed range indicated in the priority level 4 in FIG. 11 continuously for a predetermined time period (e.g. one second), the priority level 4 in FIG. 11 is selected at a time point T7.

Even though the vehicle body speed V0 increases suddenly between the time point T6 and the time point T7, the priority level 3 in FIG. 7 is selected as to increase in OSC brake target threshold speed and the vehicle body speed V0 increases slowly. The vehicle is thus inhibited from travelling excessively.

If accelerator operation is subsequently cancelled by sudden accelerator restoring operation at a time point T8, the priority level 5 in FIG. 7 is selected and the OSC brake target threshold speed is set to a value allowing relatively large deceleration (e.g. 0.1 G). The vehicle body speed V0 is thus decreased with relatively large deceleration. If the large deceleration period T elapses at a time point T9, the priority level 6 in FIG. 7 is selected and the OSC brake target threshold speed is set to have deceleration smaller than that in the large deceleration period T. The vehicle body speed V0 is thus decreased with relatively small deceleration.

If a driver performs brake operation at a time point T10 in this state and the vehicle body speed V0 is decreased with relatively large deceleration, the priority level 4 in FIG. 7 is selected again and the OSC brake target threshold speed is set to a value allowing relatively large deceleration (e.g. 0.1 G). A value allowing predetermined deceleration is selected for the first brake target threshold speed TVBtmp1 in the priority level 4 in FIG. 7. The first brake target threshold speed TVBtmp1 is set to a smaller one of the brake target threshold speed TVB at the previous control cycle and the vehicle body speed V0. Even when the vehicle body speed V0 suddenly decreases, the first brake target threshold speed TVBtmp1 is decreased in conformity with the decrease and the brake target threshold speed TVB is set to a small value. Accordingly, the brake target threshold speed TVB can decrease in conformity with the vehicle body speed V0 in a case where the vehicle body speed V0 suddenly decreases to become lower than the brake target threshold speed TVB. The brake target threshold speed TVB is set to a value smaller than the vehicle body speed V0, so as to prevent the vehicle from accelerating with the vehicle body speed V0 increasing toward the brake target threshold speed TVB in spite of brake operation being performed. It is thus possible to reduce the vehicle body speed V0 with simpler operation as well as prevent acceleration of the vehicle against a driver's intention. The vehicle speed can thus be controlled in accordance with the driver's intention.

If the priority level 4 in FIG. 11 is continuously selected as to the vehicle body speed V0 similarly to the period between the time point T7 and a time point T11, the slip speed TV does not change. The TRC brake target threshold speed is thus set to a value obtained by adding the constant slip speed TV to the vehicle body speed V0. In the case where the vehicle body speed V0 thereafter becomes lower than the predetermined speed continuously for a predetermined time period (e.g. one second), the priority level 3 in FIG. 11 is selected at a time point T12. The priority level 2 in FIG. 11 is selected at a time point T13 due to further decrease in vehicle body speed V0. The TRC brake target threshold speed is thus corrected to be gradually smaller.

If gentle accelerator operation is performed at a subsequent time point T14 and gentle accelerator restoring operation is then performed, the priority level 5 in FIG. 7 is selected and the OSC brake target threshold speed is set to a value allowing relatively large deceleration (e.g. 0.1 G). The vehicle body speed V0 is thus decreased with relatively large deceleration.

FIGS. 15A and 15B are a timing chart of a case where the travel surface is a desert road surface. Because such a road surface has high road-surface resistance, the vehicle tends to stall when braking force is generated by brake control.

Behavior similar to that in FIGS. 14A and 14B are performed initially during the period between the time point T0 and the time point T3. Behavior similar to that in FIGS. 14A and 14B are basically performed also during the period between the time point T4 and the time point T6. If an acceleration slip is generated at one of the wheels FL to RR during the period between the time point T4 and the time point T6 as well as at time points Ta, Tb, and Tc indicated after the time point T6, the brake control amount is set so as to achieve inhibition of the acceleration slip. Specifically, if the wheel speed VW** exceeds the TRC brake target threshold speed and the OSC brake target threshold speed, there is set requested braking force for the wheel having the acceleration slip. The requested braking force is required for inhibition of the acceleration slip or prevention of sudden acceleration of the vehicle against a driver's intention. The brake control amount is set in accordance with the requested braking force.

In a state where the vehicle body speed V0 gradually increases as in this example, the priority level sequentially shifts from 1 to 5 in FIG. 11 in accordance with the vehicle body speed V0. The first threshold TV1 increases gradually and the slip speed TV increases accordingly. There is thus a larger difference between the TRC brake target threshold speed set to a value obtained by adding the slip speed TV to the vehicle body speed V0 and the body speed V0. Along with increase in vehicle body speed V0, the  wheel TRC target fluid pressure TTP1 as the brake control amount upon generation of an acceleration slip (see step 165 in FIG. 2B) is decreased gradually and requested braking force is decreased.

In addition, as the priority level shifts sequentially from 1 to 5 in FIG. 11, the first brake coefficient TB1 is also decreased gradually. The TRCbrake correction coefficient TB is thus decreased gradually along with increase in vehicle body speed V0, and the  wheel TRC final target fluid pressure TTP2 is further decreased.

The second brake coefficient TB2 has a small value in the case where road-surface resistance is high. The TRCbrake correction coefficient TB is provided with an upper limit value guard with a small value so that the  wheel TRC final target fluid pressure TTP2 has a smaller value. The TRC threshold TV2 has a large value in the case where travel resistance is high. The slip speed TV is thus provided with a lower limit value guard having a larger value. The  wheel TRC target fluid pressure TTP1 as the brake control amount upon generation of an acceleration slip can have a small value.

As described above, the vehicle control device according to the present embodiment executes the control satisfying the conditions (1) to (3). There are generated driving force required for execution of the control satisfying the condition (1) and braking force required for execution of the control satisfying the conditions (2) and (3). When the control satisfying the condition (3) is executed, TRC matched to the vehicle travel state is executed for improvement of the ground-covering properties.

Other Embodiments

The present invention is not limited to the embodiment described above but can be modified appropriately within the scope of the claims.

For example, the control satisfying the condition (1) to the control satisfying the condition (3) are all executed in the above embodiment. The vehicle control device can alternatively be configured to execute only the control satisfying the condition (3) or execute the control satisfying the condition (3) along with only one of the control satisfying the condition (1) and the control satisfying the condition (2). The above embodiment merely exemplifies the methods of setting the engine target threshold speed, the OSC brake target threshold speed, and the TRC brake target threshold speed. For example, various parameters and maps referred to for setting of these values can be changed appropriately, or not all of the parameters and the maps may be applied but only part thereof can be applied.

The above embodiment exemplifies a vehicle equipped with an engine, thus exemplifies engine output as driving force according to accelerator operation and engine target threshold speed as target speed corresponding to the engine output. However, this is merely an exemplary form of outputting driving force according to accelerator operation, and can be replaced with a different form. For example, driving force according to accelerator operation corresponds to electrical output according to accelerator operation in an electric vehicle, and to the sum of electrical output according to accelerator operation and engine output in a hybrid vehicle. The engine target threshold speed is exemplified as target speed corresponding to driving force according to accelerator operation. Driving force target threshold speed can be set as target speed corresponding to driving force according to accelerator operation and can be a target of comparison with the vehicle body speed V0.

According to the above embodiment, whether or not OSC should be executed is determined in accordance with the state of the OSC switch 23 and the gear position of the auxiliary transmission 2b. Alternatively, a road surface condition can be detected and whether or not OSC should be executed can be determined in accordance with a detection result of the road surface condition. For example, a road surface with large recesses and projections or with high road-surface resistance, or a road surface with a large surface gradient such as that of a steeply sloping road can be determined to have a road surface condition of an off road or the like. In this case, it can be determined that OSC should be executed under the road surface condition, and OSC can be executed automatically.

Those portions configured to execute various processing described in the above embodiments, such as the respective steps and the like depicted in the figures, correspond to various means according to the present invention. For example, the portion configured to execute the processing in step 160 corresponds to a target speed setting means and a brake control amount correction means.

REFERENCE SIGNS LIST

1: Engine, 2: Transmission device, 2a: Transmission, 2b: Auxiliary transmission, 3: driving force distribution control actuator, 10: Engine ECU, 11: Accelerator pedal, 11a: Accelerator switch, 12: LAN, 13: Brake pedal, 14: M/C, 15: Brake actuator, 16: W/C, 19: Brake ECU, 20FL to 20RR: Wheel speed sensor, 21: Brake switch, 22: M/C pressure sensor, 23: Switch, 23FL to RR: Suspension stroke sensor, 24FL to: Suspension stroke sensor, 25: Acceleration sensor

The invention claimed is:

1. A vehicle control unit applied to a vehicle including a service brake configured to generate wheel cylinder pressure in accordance with brake operation to generate braking force at each wheel, and automatically increase the wheel cylinder pressure to automatically control the braking force of the wheel, the vehicle control unit comprising:

an electronic control unit configured to set traction brake target threshold speed as target speed of wheel speed of the vehicle, and generate braking force with the service brake when the wheel speed exceeds the target speed and an acceleration slip is generated, to execute traction control of causing the wheel speed to approach the traction brake target threshold speed, and determine a degree of a stall prevention request of the vehicle, and reduce a brake control amount for generation of braking force by the traction control in a case where the degree of the stall prevention request is high in comparison to a case where the degree is low; wherein the electronic control unit is configured to determine, in accordance with an accelerator opening rate, that the degree of the stall prevention request is higher as the accelerator opening rate is larger, and reduce the brake control amount for generation of braking force by the traction control in a case where the accelerator opening rate is large in comparison to a case where the accelerator opening rate is small, and set engine output of the vehicle with an upper limit value if the accelerator opening rate exceeds a predetermined threshold.

2. The vehicle control unit according to claim 1, wherein the electronic control unit is configured to determine that the degree of the stall prevention request is higher as vehicle body speed of the vehicle is higher, and reduces the brake control amount for generation of braking force by the traction control in a case where the vehicle body speed is high in comparison to a case where the vehicle body speed is low.

3. The vehicle control unit according to claim 1, wherein the electronic control unit is configured to detect road-surface resistance of a road surface travelled by the vehicle, determines that the degree of the stall prevention request is higher as the road-surface resistance is higher, and reduces the brake control amount for generation of braking force by the traction control in a case where the road-surface resistance is high in comparison to a case where the road-surface resistance is small.

4. The vehicle control unit according to claim 2, the electronic control unit is configured to detect road-surface resistance of a road surface travelled by the vehicle, determines that the degree of the stall prevention request is higher as the road-surface resistance is higher, and reduces the brake control amount for generation of braking force by the traction control in a case where the road-surface resistance is high in comparison to a case where the road-surface resistance is small.

* * * * *